(12) United States Patent
Szogi et al.

(10) Patent No.: US 8,673,046 B1
(45) Date of Patent: Mar. 18, 2014

(54) PROCESS FOR REMOVING AND RECOVERING PHOSPHORUS FROM ANIMAL WASTE

(75) Inventors: Ariel A. Szogi, Florence, SC (US); Matias B. Vanotti, Florence, SC (US); Patrick G. Hunt, Florence, SC (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 404 days.

(21) Appl. No.: 12/905,226

(22) Filed: Oct. 15, 2010

Related U.S. Application Data

(63) Continuation-in-part of application No. 12/026,346, filed on Feb. 5, 2008, now abandoned.

(51) Int. Cl.
    *C05F 3/00* (2006.01)
(52) U.S. Cl.
    USPC ............ 71/21; 71/11; 71/12; 71/15; 210/669; 210/666
(58) Field of Classification Search
    USPC ............................................. 71/21
    See application file for complete search history.

(56) References Cited

U.S. PATENT DOCUMENTS

| | | | | |
|---|---|---|---|---|
| 4,038,180 | A | * | 7/1977 | Talbert ............................ 210/711 |
| 5,378,257 | A | * | 1/1995 | Higashida ............................ 71/12 |
| 5,422,015 | A | * | 6/1995 | Angell et al. ................. 588/257 |
| 5,482,528 | A | * | 1/1996 | Angell et al. ..................... 71/12 |

(Continued)

FOREIGN PATENT DOCUMENTS

JP     2000189927     *    7/2000

OTHER PUBLICATIONS

Production of technical grade phosphoric acid from incinertor sewage slduge ash (ISSA). By S donatello, et al. Waste Management 30 (2010) 1634-1642.*

(Continued)

*Primary Examiner* — Patricia L Hailey
*Assistant Examiner* — Colette Nguyen
(74) *Attorney, Agent, or Firm* — John D. Fado; G. Byron Stover; Gail E. Poulos

(57) ABSTRACT

A process for removing phosphorus from solid poultry or animal wastes involving (a) mixing solid poultry or animal wastes with water and acid at a pH lower that about 5.0 and higher than about 3.0 to form (i) a liquid extract that contains suspended solids of about 3.5 g/L and soluble phosphorus and (ii) a washed solid residue (having a N:P ratio of at least more than 4 expressed on an elemental basis), (b) separating the liquid extract from the washed solid residue to form separated liquid extract and separated washed solid residue, (c) mixing the separated liquid extract with an alkaline earth base to a pH of about 8.0 to about 11.0, (d) mixing the liquid extract with a flocculant to form (i) precipitated phosphorus solids with $P_2O_5$ content greater than about 10% and (ii) a liquid, and (e) separating the precipitated phosphorus solids from the liquid to form separated phosphorus solids and separated liquid. The process is conducted at a temperature greater than about 5° C. and less than about 50° C. The solid poultry or animal wastes are not pretreated prior to mixing the solid poultry or animal wastes with water and acid; such pretreatments include those that may cause the complete or partial loss of oxidizable organic carbon and nitrogen.

21 Claims, 9 Drawing Sheets

(56) References Cited

U.S. PATENT DOCUMENTS

| | | | |
|---|---|---|---|
| 6,409,788 B1* | 6/2002 | Sower | 71/11 |
| 6,916,426 B2* | 7/2005 | Van Slyke et al. | 210/666 |
| 7,662,205 B2* | 2/2010 | Burnham | 71/11 |
| 2003/0084693 A1* | 5/2003 | Sower | 71/11 |
| 2003/0172697 A1* | 9/2003 | Sower | 71/11 |
| 2004/0025553 A1* | 2/2004 | Cabello-Fuentes | 71/15 |
| 2007/0062232 A1* | 3/2007 | Urano et al. | 71/11 |
| 2008/0098782 A1* | 5/2008 | Urano et al. | 71/21 |

OTHER PUBLICATIONS

Process flow diagram. "A process for removing phosphorous from solid poulrry or animal wastes".*

Trace Element Speciation in Poultry Litter. by B.P. Jackson et al.*

Phosphorous Revcovery From Poultry Litter. By Szogi et al. Sep. 2008.*

Technology for Recovering Phosphorous From Incinerated Wastewater Treatment Sludge, by Masaaki Takahashi et al.*

Szogi, A.A., P.J. Bauer, and M.B. Vanotti. 2010. Fertilizer effectiveness of phosphorus recovered from broiler litter. Agron. J. 102(2):723-727. (published Feb. 2010).

Bolan, N., A. Szogi, B. Seshadri, and T. Chuasavathi. 2008. The management of phosphorus in poultry litter. Proc. New Zealand Poultry Industry Annual Conf., Oct. 7-9, Palmerson North, NZ, p. 156-168. (published Oct. 2008).

Szogi, A.A., P.J. Bauer, and M.B. Vanotti. 2008. Agronomic effectiveness of phosphorus materials recovered from manure. 13th RAMIRAN Int'l Conf., Jun. 11-14, Albana, Bulgaria. pp. 52-56. (published Jun. 2008).

Szogi, A.A., M.B. Vanotti, and P.G. Hunt. 2008. Phosphorus recovery from poultry litter. Trans. ASABE 51 (5):1727-1734. (published Sep. 2008).

Cantrell, K.B., A.A. Szogi, P.G. Hunt, M.B. Vanotti, K.S. Ro, and P.J. Bauer. 2009. Plant nutrients and bioenergy via a new quick wash procedure for livestock manures. pp. 1238-1244. Proc. Beltwide Cotton Conf., San Antonio, TX, Jan. 5-8, 2009 (CD-ROM) (published Jan. 2009).

Szogi, A.A., and M.B. Vanotti. 2009. Prospects for phosphorus recovery from poultry litter. Bioresource Tech. 100:5461-5465. (published Apr. 2009).

Szogi, A.A., M.B. Vanotti, and P.J. Bauer. 2009. Effectiveness of recovered manure phosphorus as plant fertilizer. pp. 133-136. Proc. 1st Int'l. Symp. on Management of Animal Residuals, Mar. 11-13, Florianopolis, Brazil (Sigera). (published Mar. 2009).

Szogi, A., and M. Vanotti. 2008. Closing the loop for nutrients in livestock wastes: Phosphorus recovery from animal manure. 2008 ASA Annual Mtgs., Oct. 5-9, Houston, TX. CD-ROM (published Oct. 2008).

Bolan, N. et al.; The Management of Phosphorus in Poultry litter. 2010 19th World Congress of Soil Science, Soil Solutions for a Changing World. pp. 317-320.

Szogi, A. et al.; Distribution of Phosphorus in an Ultisol Fertilized with Recovered Manure Phosphates. 2010 19th World Congress of Soil Science, Soil Solutions for a Changing World. Pages 95-.

ARS News. Mining Manure for Phosphorus. Feb. 29, 2008.

Szogi, A., Bauer, P., and Vanotti, M. 2009.Agronomic effectiveness of phosphorus materials recovered from manure. Bulgarian Journal of Ecological Science—Ecology and Future 8(4):9-12. (Dec. 2009).

* cited by examiner

PROCESS FOR REMOVING AND RECOVERING PHOSPHORUS FROM ANIMAL WASTE

REFERENCE TO RELATED APPLICATION

This application claims the benefit of U.S. patent application Ser. No. 12/026,346, filed 5 Feb. 2008, which is incorporated herein by reference in its entirety.

FIELD OF THE INVENTION

The invention relates to a process for extracting and recovering phosphorus from animal wastes.

BACKGROUND OF THE INVENTION

Animal production, a major component of the U.S. agricultural economy, is at risk because of both real and perceived environmental problems. Dramatic advancements are required to protect the environment, save this vital industry, and maintain food security. Municipal and agricultural waste disposal is a major problem. For agricultural animals, the animals are confined in high densities and lack functional and sustainable treatment systems. Confined livestock produce approximately 1329 million pounds of recoverable manure phosphorus annually with about 70% (approximately 925 million pounds) in excess of on-farm needs. This livestock production system was developed in the early and mid 20$^{th}$ century prior to the current trend in high concentrated livestock operations. One of the main problems in sustainability is the imbalance of nitrogen (N) and phosphorus (P) applied to land (Edwards, D. R., and T. C. Daniel, Bioresource Technology, 41: 9-33 (1992)). Nutrients in manure are not present in the same proportion needed by crops, and when manure is applied based on a crop's nitrogen requirement, excessive phosphorus is applied resulting in phosphorus accumulation in soil, phosphorus runoff, and eutrophication of surface waters (Sharpley et al., J. Soil Water Conserv, 62: 375-389 (2007); Heathwaite, L., et al., J. Environ. Qual., 29: 158-166 (2000); Sharpley, A., et al., J. Environ. Qual., 29: 1-9 (2000); Edwards and Daniel, Bioresource Technology, 41: 9-33 (1992)).

Phosphorus build up in soils to excessively high levels due to animal manures often results in eutrophication and pollution of surface waters due to intense application of animal manures to land (Edwards and Daniel, 1992; USEPA, 1992; Heathwaite et al., 2000; Sharpley et al., 2000). This is a national problem affecting dairy, poultry, and swine production systems. Consequently, a substantial amount of manure phosphorus needs to be moved at least off the farms and some needs to be transported longer distances beyond county limits to solve accumulation and distribution problems of this nutrient (USDA-ERS, Agricultural Outlook, September 2000, p. 12-18). Manure nutrients in excess of the assimilative capacity of land available on farms are an environmental concern often associated with confined livestock production. The ability to extract-phosphorus from manure will be critical to poultry and livestock producers to accomplish manure utilization through land application without elevating soil phosphorus levels when land is limited. In addition, the aspect of phosphorus reuse is becoming important for the fertilizer industry because the world phosphorus reserves are limited (Smil, V., Annu. Rev. Energy Environ., 25(1):53-88 (2000)). According to the Potash and Phosphate Institute, the United States annual consumption of inorganic phosphorus for crop production is about 3700 million pounds (Potash and Phosphate Institute, 2002, Plant nutrient use in North American agriculture, Technical Bulletin 2002-1). On the other hand, for the U.S. as a whole, confined livestock produces about 1,329 million pounds of recoverable manure phosphorus annually with about 70% (about 925 million pounds) in excess of on-farm needs (Kellogg, R. L., et al., Manure nutrients relative to the capacity of cropland and pastureland to assimilate nutrients: Spatial and temporal trends for the United States, NRCS and ERS GSA Publ. No. nps00-0579. Washington, D.C., 2000). Therefore, reuse of phosphorus recovered from animal waste could substitute about 25% of the phosphorus now obtained from mining.

Farmers obtain nutrients for their crops from inorganic commercial fertilizers and from organic sources such as animal manure and biosolids from wastewater treatment plants. Inorganic nitrogen and phosphorus compounds are water soluble and readily available to plants. Most organic nutrient sources contain both inorganic forms of nutrients and forms that must first be mineralized or decomposed to become available to plants. The movement of nitrogen and phosphorus through soil are different. If nitrogen is converted to the highly water soluble nitrate-nitrogen form, and it is not used during plant growth, it can move through the soil-water system and be vulnerable to leaching into groundwater. Soil amended with large quantities of organic or inorganic phosphorus may generate significant amounts of soluble phosphorus that can be readily transported by surface and subsurface runoff and groundwater leachate.

A further problem with the management of human and animal waste is the loss of nutrients. Phosphates and nitrates are fundamental nutrients which determine the possibility for plant and animal life to occur. They are taken up by plants and the plants are eaten by animals. Subsequently they should return to the soil as manure in a normal agricultural cycle, but in the present situation in most cases they end up washed into the sea, whether they are simply dumped in a river or go through a municipal wastewater treatment The lack of closure of the nutrient cycle is a major environmental problem, especially in the case of phosphates which, at present, are considered a mineral resource to be extracted. Excess of phosphates in the seas causes eutrophication. The depletion of the mineral phosphate resources is a problem which will become important in the near future (Scrivani et al., Solar trough concentration for fresh water production and waste water treatment, Desalination, 206: 485-493 (2007))

In livestock operations, the crop acreage is typically calculated to allow for uptake by the crops of the applied nitrogen from the soil, thus minimizing movement of nitrogen in ground and surface water beyond the farm's boundaries.

Unlike carbon and nitrogen, phosphorus cannot volatilize from the system. Crops typically take up less phosphorus from the soil than that applied in the manure because the acreage has been calculated for nitrogen removal, which requires less acreage. The soil absorbs phosphorus but over time reaches saturation. Additional application of phosphorus can cause release of phosphorus to surface waters beyond the farm's boundaries, risking oxygen depletion of water organisms. Measures for reducing phosphorus content of manure must be considered.

Phosphorus inputs accelerate eutrophication when it runs off into fresh water and has been identified as a major cause of impaired water quality (Sharpley et al., 2000). Eutrophication restricts water use for fisheries, recreation, industry, and drinking due to the increased growth of undesirable algae and aquatic weeds and resulting oxygen shortages caused by their death and decomposition. Also many drinking water supplies throughout the world experience periodic massive surface blooms of cyanobacteria. These blooms contribute to a wide range of water-related problems including summer fish kills, unpalatability of drinking water, and formation of trihalomethane during water chlorination. Consumption of cyanobacteria blooms, or water-soluble neuro- and hepatoxins released when these blooms die, can kill livestock and may pose a serious health hazard to humans. Recent outbreaks of the dinoflagellate *Pfiesteria piscicida* in near-shore waters of the eastern United States also may be influenced by nutrient enrichment. Although the direct cause of these outbreaks is unclear, the scientific consensus is that excessive nutrient loading helps create an environment rich in microbial prey and organic matter that *Pfiesteria* and menhaden (target fish) use as a food supply. In the long-term, decreases in nutrient loading will reduce eutrophication and will likely lower the risk of toxic outbreaks of *Pfiesteria*-like dinoflagellates and other harmful algal blooms. These outbreaks and awareness of eutrophication have increased the need for solutions to phosphorus run-off.

Past research efforts on phosphorus removal from wastewater using chemical precipitation have been frustrating due to the large chemical demand and limited value of by-products such as alum sludge, or because of the large chemical demand and huge losses of ammonia at the high pH that is required to precipitate phosphorus with calcium (Ca) and magnesium (Mg) salts (Westerman and Bicudo, Tangential flow separation and chemical enhancement to recover swine manure solids and phosphorus, ASAE Paper No. 98-4114, St. Joseph, Mich., ASAE, 1998; Loehr et al., Development and demonstration of nutrient removal from animal wastes, Environmental Protection Technology Series, Report EPA-R2-73-095, Washington, D.C., EPA, 1973). Other methods used for phosphorus removal include flocculation and sedimentation of solids using polymer addition, ozonation, mixing, aeration, and filtration (see U.S. Pat. No. 6,193,889 to Teran et al). U.S. Pat. No. 6,153,094 to Craig et al. teaches the addition of calcium carbonate in the form of crushed limestone to form calcium phosphate mineral. The patent also teaches adsorbing phosphorus onto iron oxyhydroxides under acidic conditions.

Continuing efforts are being made to improve agricultural, animal, and municipal waste treatment methods and apparatus. U.S. Pat. No. 5,472,472 and U.S. Pat. No. 5,078,882 (Northrup) disclose a process for the transformation of animal waste wherein solids are precipitated in a solids reactor, the treated slurry is aerobically and anaerobically treated to form an active biomass. The aqueous slurry containing bioconverted phosphorus is passed into a polishing ecoreactor zone wherein at least a portion of the slurry is converted to a beneficial humus material. In operation the system requires numerous chemical feeds and a series of wetland cells comprising microorganisms; animals, and plants. See also U.S. Pat. Nos. 4,348,285 and 4,432,869 (Groeneweg et al); U.S. Pat. No. 5,627,069 to Powlen; U.S. Pat. No. 5,135,659 to Wartanessian; and U.S. Pat. No. 5,200,082 to Olsen et al (relating to pesticide residues); U.S. Pat. No. 5,470,476 to Taboga; and U.S. Pat. No. 5,545,560 to Chang.

One of the main problems in sustainability of poultry production is the imbalance between nitrogen and phosphorus in the waste (Edwards and Daniel, USEPA, 2001). Nutrients in manure are not present in the same proportion needed by crops. The mean N:P ratio in manure is generally lower than the mean N:P ratio taken up by major grain and hay crops (USDA, 2001). To solve the problem of a phosphorus buildup in soil and increased potential for phosphorus losses through runoff and subsequent eutrophication of surface waters, efforts are being made to immobilize phosphorus or find alternative uses for poultry litter such as burning and gasification and transport to agricultural lands with low levels of phosphorus. Current methods for handling phosphorus in waste include immobilization, see for example U.S. Pat. No. 6,923,917; gasification (Sheth, A. C., and A. D. Turner, Trans. ASAE, 45(4):1111-1121 (2002)), precipitation, see U.S. Pat. No. 7,005,072; litter transport to agricultural lands with low levels of phosphorus (Jones, K., and G. D'Souza, Agric. Resour. Econ. Rev., 30(1):56-65 (2001); Kelleher, B. P., et al., Bioresour. Technol., 83(1) 27-36 (2002); Keplinger, K. O., and L. M. Hauck, Impacts of livestock concentration and application rate restrictions on manure utilization, ASAE/CSAE Meeting Presentation, Paper No. 042204. ASAE, St. Joseph, Mich., 2004); anaerobic digestion by combustion (USDOE-NREL, 2000, Biomass co-firing: A renewable alternative for utilities, NREL/FS-570-28009, DOE/GO-102000-1055, U.S. Department of Energy, National Renewable Energy Laboratory), etc.

While various systems have been developed for treating solid animal waste for the removal of phosphorus, there still remains a need in the art for a more effective treatment system for the phosphorus. The present invention, different from prior art systems, provides a system for extracting phosphorus from solid animal manure using a selective extraction and subsequent recovery.

SUMMARY OF THE INVENTION

In accordance with the present invention, there is provided a process for removing phosphorus from solid poultry or animal wastes involving: mixing the solid poultry or animal wastes with water and acid at a pH lower that about 5.0 and higher than about 3.0 to form (i) a liquid extract that contains suspended solids of about 3.5 g/L and soluble phosphorus and (ii) a washed solid residue, wherein the washed solid residue has a N:P ratio of at least more than 4 expressed on an elemental basis and contains no more than about 40% of the total phosphorus in the solid poultry or animal wastes; separating the liquid extract from the washed solid residue to form separated liquid extract and separated washed solid residue; mixing the separated liquid extract with an alkaline earth base to a pH of about 8.0 to about 11.0; mixing the liquid extract with a flocculant to form (i) precipitated phosphorus solids with $P_2O_5$ content greater than about 10% and (ii) a liquid; and separating the precipitated phosphorus solids from the liquid to form separated phosphorus solids and separated liquid.

Also in accordance with the present invention, there is provided a material produced by a process involving: mixing solid poultry or animal wastes with water and acid at a pH lower that about 5.0 and higher than about 3.0 to form (i) a liquid extract that contains suspended solids of about 3.5 g/L and soluble phosphorus and (ii) a washed solid residue, wherein the washed solid residue contains a N:P ratio of at least more than 4 expressed on an elemental basis and contains no more than about 40% of the total phosphorus in the solid poultry or animal wastes; separating the liquid extract from the washed solid residue to form-separated liquid extract and separated washed solid residue; mixing the separated liquid extract with an alkaline earth base to a pH of about 8.0 to about 11.0; mixing the liquid extract with a flocculant to form (i) precipitated phosphorus solids with $P_2O_5$ content greater than about 10% and (ii) a liquid; and separating the precipitated phosphorus solids from the liquid to form separated phosphorus solids and separated liquid. The material is the separated phosphorus solids and contains greater than about 10% $P_2O_5$, greater than about 10% Ca, less than about 5% N, and less than about 5% K as $K_2O$.

Still in accordance with the present invention is a material produced by a process involving: mixing solid poultry or animal wastes with water and acid at a pH lower that about 5.0 and higher than about 3.0 to form (i) a liquid extract that contains suspended solids of about 3.5 g/L and soluble phosphorus and (ii) a washed solid residue; and separating the liquid extract from the washed solid residue to form separated liquid extract and separated washed solid residue. The material is the separated, washed solid residue and contains a N:P ratio of at least more than 4 expressed on an elemental basis and contains no more than about 40% of the total phosphorus in the solid poultry or animal wastes.

DETAILED DESCRIPTION OF THE INVENTION

Land application of large amounts, of solid animal wastes is an environmental concern often associated with excess phosphorus in soils and potential pollution of water resources. Recovery of phosphorus from solid waste was developed for extraction and recovery of phosphorus from solid poultry or animal wastes (e.g., aminal solid manures and poultry manure). The term solid poultry or animal wastes includes any materials containing a mixture of poultry or animal urine, feces, undigested feed, and optionally bedding material. The invention can use different types of poultry manure such as litter (manure mixed with bedding material) or cake (manure with minimal bedding material). The invention can also use different types of animal wastes such as manure mixed with bedding materials (such as in deep bedding systems for pig or cow rearing) or animal wastes with minimal bedding material (such as scraped or centrifuged manure or manure collected with belt systems).

Figure 1:
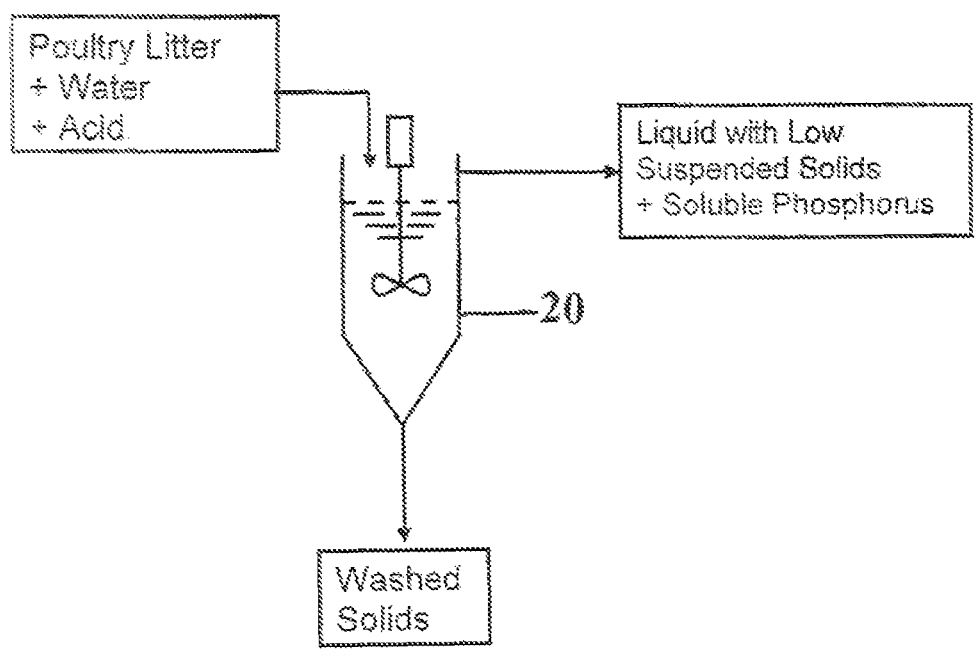
FIG. 1 is a schematic drawing of the step 1 of the quick wash process of poultry litter showing phosphorus extraction showing an extraction tank 20 as described below.

The process generally includes three steps: (1) phosphorus extraction, (2) phosphorus recovery, and (3) phosphorus recovery enhancement. In the first step (FIG. 1), solid poultry or animal wastes (e.g., animal solid manures or poultry manure) is washed by mixing it with water and acid in a reactor vessel at a pH lower than about 5.0 (e.g., lower than 5.0) and higher than about 3.0 (e.g., higher than 3.0); preferably at a pH of about 3.1 (e.g., 3.1) to about 5.0 (e.g., 5.0), preferably at a pH of about 3.1 (e.g., 3.1) to about 4.5 (e.g., 4.5) to form a liquid extract and a washed solid residue. The washed solid residue is settled and is dewatered to prevent unnecessary carbon and nitrogen oxidation and digestion; the washed solid residue contains the oxidizible organic carbon and nitrogen fraction that would be digested and oxidized if the animal solid manure or poultry manure had been instead washed by mixing it with water and acid at a low pH (e.g., below 3.0) or that would be lost by ignition (or that would be lost if the animal solid manure or poultry manure had been incinerated before being mixed with water and acid at a low pH (i.e., below 3). The first step extracts at least 60% (e.g., at least 60%) of the phosphorus contained in the original solid poultry or animal wastes (in other words, no more than 40% of the original phosphorus remains in the washed solid residue while the balance is in the liquid extract), preferably at least about 65% (e.g., at least 65%), preferably at least 67%, preferably at least 68%, preferably at least 81%; and the first step extracts no more than about 30% (e.g., 30%) of the nitrogen contained in the original solid poultry or animal wastes (in other words, no more than 70% of the original phosphorus remains in the washed solid residue while the balance is in the liquid extract), preferably no more than 22.0%, preferably no more than 26.8%, preferably no more than 27.4%. The washed solid residue has a N:P ratio (expressed on an elemental basis) of at least more than about 4 (e.g., more than 4; preferably at least 4.1, more preferably at least 4.3, preferably at least 4.4, preferably at least 5.5, preferably at least 9.8, preferably at least 11.1). The washed solid residue contains no more than about 40% (e.g., no more than 40%) of the total phosphorus (P and/or $P_2O_5$) in the original untreated waste (preferably no more than 37.3%, preferably no more than 35.2%, preferably no more than 29.9%, preferably no more than 26.9%, preferably no more than 26.7%, preferably no more than 26.3%, preferably no more than 25.9%, preferably no more than 25.7%, preferably no more than 24.7%, preferably no more than 22.5%, preferably no more than 18.4%, preferably no more than 17.6%, preferably no more than 16.7%, preferably no more than 16.6%, preferably no more than 16.1%, preferably no more than 15.9%, preferably no more than 15.7%, preferably no more than 15.5%, preferably no more than 14.1%, preferably no more than 13.4%); based on Table 10: the washed solid residue contains less than about 5% (e.g., less than 5%) $P_2O_5$, preferably less than 4%, preferably less than 3%, preferably less than 2%, preferably no more than 1.15%, preferably no more than 1.06%, preferably no more than 0.96%; the washed solid residue contains less than about 5% (e.g., less than 5%) P, preferably less than 4%, preferably less than 3%, preferably less than 2%, preferably less than 1%, preferably no more than 0.52%, preferably no more than 0.50%, preferably no more than 0.46%, preferably no more than 0.42%, preferably no more than 0.40%. The washed solid residue contains about 100% (e.g., 100%) of the carbon in the original untreated waste; based on Table 10: the washed solid residue contains about 34% to about 42% carbon. The washed solid residue contains at least about 60% (e.g., at least 60%) of the nitrogen in the original untreated waste, preferably at least 66.1%, preferably at least 68.7%, preferably at least 74.9%, preferably at least 77.4%, preferably at least 78.3%, preferably at least 80.4%, preferably at least 81.1%, preferably at least 82.5%, preferably at least 83.4%, preferably at least 83.7%, preferably at least 85.4%, preferably at least 85.8%, preferably at least 86.7%, preferably at least 87.0%, preferably at least 88.2%, preferably at least 88.6%, preferably at least 89.9%, preferably at least 97.8%; based on Table 10: the washed solid residue contains less than about 5% (e.g., less than 5%) N, preferably less than 4%, preferably less than 3%, preferably no more than 2.16%, preferably no more than 2.10%, preferably no more than 1.96%, preferably no more than 1.82%, preferably no more than 1.76%. The washed solid residue contains no more than about 20% (e.g., no more than 20%) of the potassium in the original untreated waste, preferably no more than about 15% (e.g., no more than 15%), preferably no more than 14.6%, preferably no more than 14.4%, preferably no more than 13.8%, preferably no more than 13.3%, preferably no more than 13.0%; based on Table 10: the washed solid residue contains, less than about 5% (e.g., less than 5%) K, preferably less than 4%, preferably less than 3%, preferably less than 2%, preferably less than 1%, preferably no more than 0.50%, preferably no more than 0.48%, preferably no more than 0.44%, preferably no more than 0.39%, preferably no more than 0.38%. The washed solid residue contains no more than about 20% (e.g., no more than 20%) of the $K_2O$ in the original untreated waste, preferably no more than about 15% (e.g., no more than 15%), preferably 14.7%, preferably no more than 14.5%, preferably no more than 13.8%, preferably no more than 13.2%, preferably no more than 12.9%; based on Table 10: the washed solid residue contains less than about 5% (e.g., less than 5%) $K_2O$, preferably less than 4%, preferably less than 3%, preferably less than 2%, preferably less than 1%, preferably no more than 0.59%, preferably no more than 0.57%, preferably no more than 0.52%, preferably no more than 0.47, preferably no more than 0.45%. This first step produces a liquid extract containing low suspended solids of less than about 3.5 g/L (e.g., less than 3.5 g/L; preferably less than about 3 g/L (e.g., less than 3 g/L)) and extracted soluble phosphorus (e.g., generally more than about 600 mg/L (more than 600 mg/L); preferably at least about 613 mg/L (at least 613 mg/L)); the liquid extract contains the phosphorus in the original material less the phosphorus in the washed solid residue. The washed solid manure residue is subsequently separated from the liquid extract and dewatered; unnecessary carbon and nitrogen oxidation and digestion are prevented by dewatering the residue.

Figure 2:
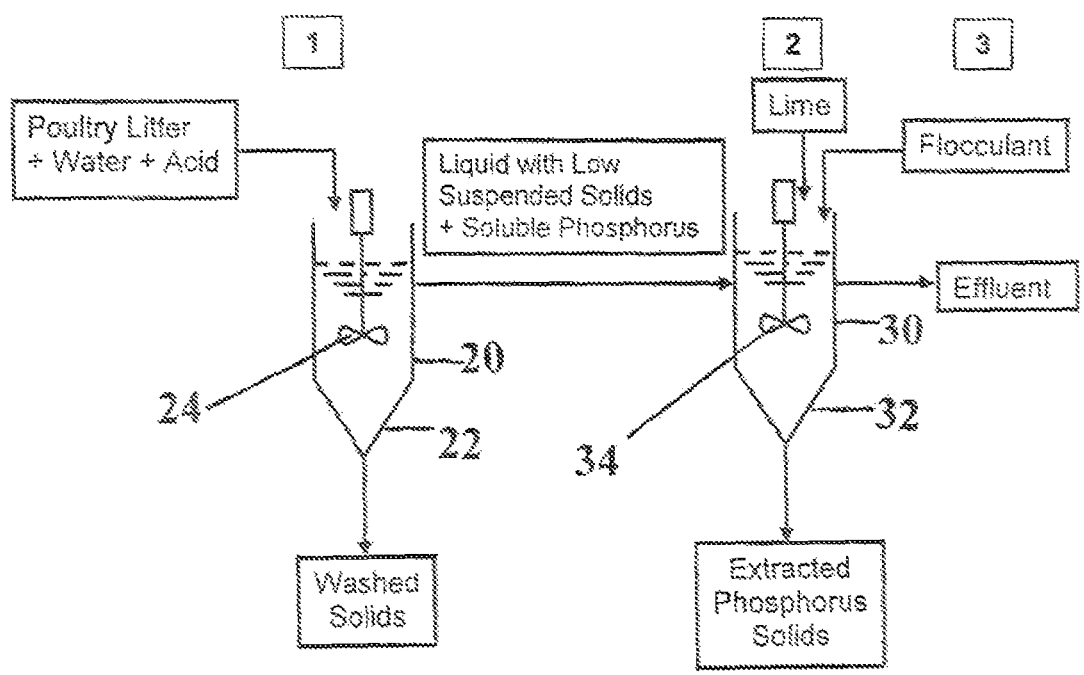
FIG. 2 is a schematic drawing of the quick wash process showing: (1) mixing solid poultry or animal wastes with water and acid to perform a selective hydrolysis for phosphorus extraction in an extraction tank 20 to form a separated liquid extract and separated washed solid residue; (2) treatment of separated liquid extract with lime and flocculant in a phosphorus removal tank 30, and to form precicpitated phosphorus solids (3) in removal tank 30 as described below.
Figure 8:
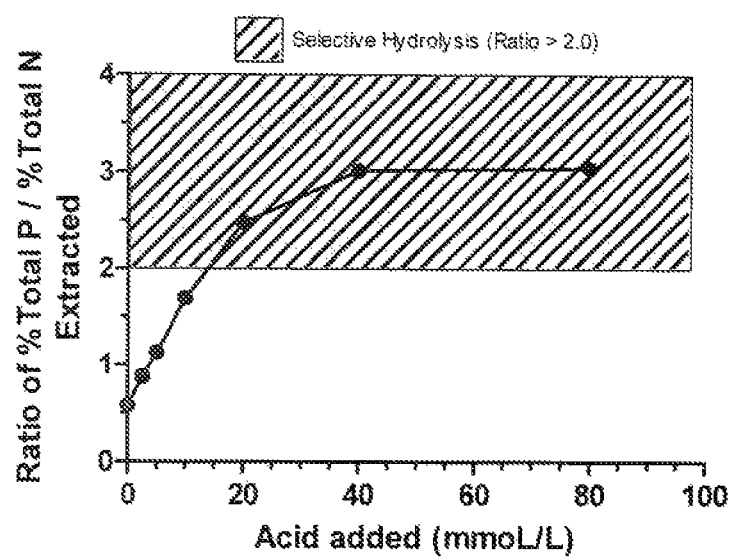
FIG. 8 shows effect of citric acid treatment on the ratio of percent total phosphorus extracted to percent total nitrogen extracted from poultry litter as described below. For purposes of the present invention, selective hydrolysis is defined as any hydrolysis reaction that, relative to the initial phosphorus and nitrogen contents in the solid poultry or animal wastes, allows extraction of at least twice as much of the phosphorus (in percentage terms) than the nitrogen (y-axis≥2.0, preferably >2.0); in other words, allows extraction of at least twice as much of phosphorus (in percentage terms) than nitrogen (e.g., 55% phosphorus and 25% nitrogen extracted).

The liquid extract is transferred to a second vessel where phosphorus is recovered in steps 2 and 3 (FIG. 2). In step 1, organically bound phosphorus is first converted to soluble-P by selective, hydrolysis reactions using mineral or organic acids. This process hydrolyzes organic phosphorus-containing compounds rapidly in order to extract the phosphorus; more phosphorus goes into solution than nitrogen under the acidic conditions utilized (e.g., 3>pH<5). This step also releases phosphorus from insoluble inorganic phosphate complexes. Therefore, for purposes of the present invention, selective hydrolysis is defined as any hydrolysis reaction which allows extraction of at least twice as much of phosphorus (in percentage terms) than nitrogen (Table 2 and FIG. 8; see also Table 11). The selective hydrolysis and solubilization of phosphorus compounds is obtained by using organic acids such as citric, oxalic, malic, etc., mineral acids such as hydrochloric or sulfuric, for example, or a mixture of both mineral and organic acids or their precursors. The acids used in the process can be produced using different acid precursors that consist of organic substrate including animal waste transformed into acid compounds by bacterial, yeast, or fungal microorganisms for example, such as *Thiobacillus* sp., *Arthrobacter paraffineus*, *Candida* sp., and *Aspergillus niger*. Furthermore, any mineral acid or organic acid can be used in the selective hydrolysis step. Although the preferred acids for quick wash are those acids which do not add phosphorus or nitrogen, the use of acids such as nitric, ethyldiamintetracetic, sulfuric or phosphoric may be used during the process of the present invention to fortify the final extracted product with nitrogen, sulfur or phosphorus.

In step 2, phosphorus is precipitated by addition of an alkaline earth base, such as for example lime (calcium hydroxide), magnesium hydroxide, calcium oxide, magnesium oxide, and mixtures thereof, to the liquid extract to a pH range of not less than about 8.0 (e.g., not less than 8.0) to not more than about 11.0 (e.g., not more than 11.0), preferably not less than about 9.0 (e.g., not less than 9.0) to not more than about 11.0 (e.g., not more than 11.0), to form an alkaline earth metal-containing phosphorus compound.

In step 3, an organic flocculant is added into the second vessel to enhance precipitation and phosphorus grade of the precipitated product (steps 2 and 3 may occur simultaneously or sequentially; preferably sequentially). After a settling period, of less than about 30 minutes (e.g. less than 30 minutes) the precipitated phosphorus-rich solid is removed from the bottom of the second vessel while the supernatant liquid is recycled back into the quick wash system or land applied. The flocculant is a poly-electrolyte and is added at less than about 10 ppm (e.g., less than 10 ppm) to increase the yield of filtering. One example of a filtering device is a 0.84 m×0.84 m×0.13 sieve box with a 0.6 wire mesh bottom and a commercial polypropylene non-woven fabric (Dupont E.I. de Nemours, N.J.). One of ordinary skill in the art could readily determine any other filter that would be useable in the process of the present specification. The present invention produces a phosphorus fertilizer material (i.e., the precipitated phosphorus-rich solid after steps 2 and 3) that contains: (1) greater than about 10% $P_2O_5$ (e.g., more than 10%; preferably 10.91% or more; preferably 10.95% or more; preferably 11.06% or more; preferably 1.1.16 or more %; preferably at least 11.21%); (2) greater than about 4% P (e.g., more than 4%; preferably 4.57% or more; preferably 4.61% or more; preferably 4.70% or more; preferably 4.79% or more; preferably at least 4.83%); (3) less than about 5% N (e.g., less than 5% N; preferably less than 4.5%; preferably less than about 4% (e.g., less than 4%); preferably 3.64% or less; preferably 3.61% or less; preferably 3.54% or less; preferably 3.47% or less; preferably no more than 3.44%); (4) less than about 5% K as $K_2O$ (e.g., less than 5%; preferably less than about 4.5% (e.g., less than 4.5%); preferably less than about 4.0% (e.g., less than 4.0%); preferably less than about 3.5% (e.g., less than 3.5%); preferably less than about 3.0% (e.g., less than 3.0%); preferably less than about 2.5% (e.g., less than 2.5%); preferably less than about 2.0% (e.g., less than 2.0%); preferably less than about 1.5% (e.g., less than 1.5%); preferably less than 1.188%; preferably less than 1.164%; preferably less than 1.128%; preferably less than 1.08%; preferably no more than 1.068%); (5) less than about 4% K (e.g., less than 4%; preferably less than about 3.5% (e.g., less than 3.5%); preferably less than about 3.0% (e.g., less than 3.0%); preferably less than about 2.5% (e.g., less than 2.5%); preferably less than about 2.0% (e.g., less than 2.0%); preferably less than about 1.5% (e.g., less than 1.5%); preferably less than 0.99%; preferably less than 0.97%; preferably less than 0.94%; preferably less than 0.90%; preferably no more than 0.89%); (6) less than about 40% C (e.g., less than 40%; preferably less than 36.26%; preferably less than 36.11%; preferably less than 35.90%; preferably less than 35.60%; preferably no more than 35.54%); (7) more than about 10% Ca (e.g., more than 10%; preferably more than 10.27%, preferably more than 10.54%; preferably more than 11.22%; most preferably more than 11.89, preferably at least 12.117%); (8) less than about 2% Na (e.g., less than 2%; preferably less than about 1% (e.g., less than 1%); preferably less than 0.34%, preferably less than 0.33%, preferably less than 0.31%, preferably less than 0.29%, preferably no more than 0.28%); (9) less than about 2% Mg (e.g., less than 2%; preferably less than about 1.5% (e.g., less than 1.5%); preferably less than 0.70%, preferably less than 0.69%, preferably no more than 0.68%). Furthermore, this phosphorus product is only about 15% (e.g., 15%) of the initial volume of the poultry litter.

In addition, the remaining washed solid residue has a more balanced nitrogen to phosphorus ratio that is environmentally safe for land application and use by crops. As an alternative, washed litter residue can be digested for methane production or utilized as bedding especially in areas where bedding material is in short supply.

The process is generally conducted at an ambient temperature greater than about 5° C. and less than about 50° C. (e.g., greater than 5° C. and less than 50° C.; preferably greater than about 10° C. and less than about 45° C. (e.g., greater than 10° C. and less than 45° C.); greater than about 10° C. and less than about 40° C. (e.g., greater than 10° C. and less than 40° C.); greater than about 10° C. and less than about 35° C. (e.g., greater than 10° C. and less than 35° C.); greater than about 10° C. and less than about 30° C. (e.g., greater than 10° C. and less than 30° C.); in other words the process does not require heat and the process is not exothermic.

Poultry litter used in the following experiments consisted of wood chip bedding plus manure accumulated during bird production. Broiler litter for Examples 1 and 2 below was collected from a 27,400-bird broiler house in Sumter County, South Carolina. At the time of sampling, the litter was being used by the fifth consecutive flock (approximately 6.5 flocks per year). Two composite litter samples were taken in approximately two 12-meter transects covering the width of the house. Composite samples were placed in 20-liter plastic sealed containers and stored in the freezer until preparation for laboratory experiments.

Figure 4:
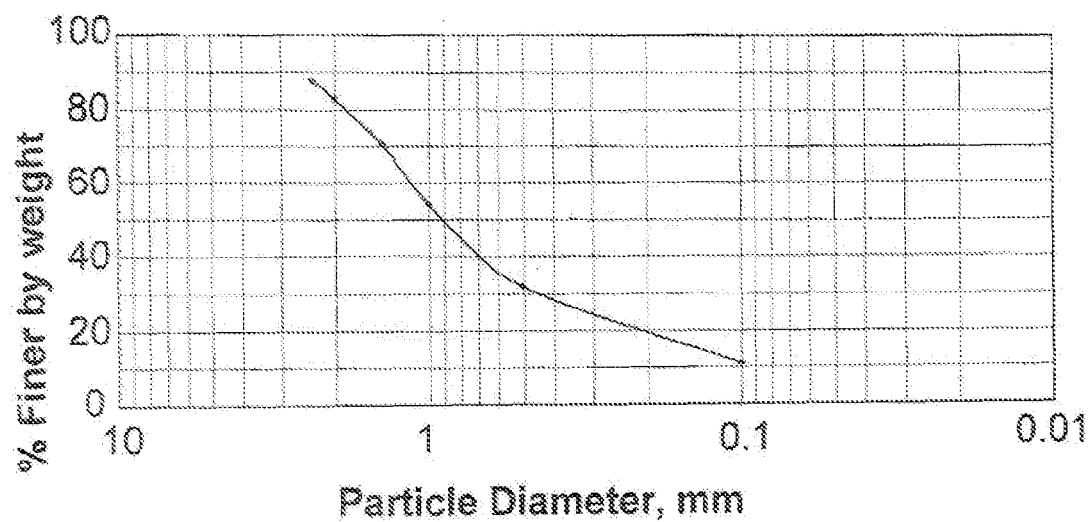
FIG. 4 is a graph showing particle size distribution of homogenized broiler litter used in field prototype experiments as described below. Each data point is the mean of three replicates.

Broiler litter used for field prototype experiments was collected from a 25,000-bird broiler house. At the time of sampling, the house was empty and between the second and third flock (5 flocks per year). Two large composite litter samples were taken in two transects along the house, in its center section between water lines, and placed in 160-L containers. The containers were sealed, transported and placed in cold storage of about <2 degrees centigrade. Two 15.2 kg samples were prepared for field prototype experiments. In average, the two samples contained approximately 28.6 (±0.6) % moisture, approximately 26.2 (±0.04) mg/kg TKN, and approximately 15.5 (±3.8) mg/kg total phosphorus (Table 1 below). Prior to field prototype tests, broiler litter was ground and homogenized using a chipper (Yard Machines 5HP model, MTD LLC, Cleveland, Ohio). Average particle size distribution of chipped poultry litter is shown in FIG. 4.

Analysis of supernatant liquid was, performed according to Standard Methods for the Examination of Water and Wastewater (APHA, 0.1998, Standard Methods for the Examination of Water and Wastewater, 20th edition. Washington, D.C., American Public Health Association, American Water Works Association, and Water Environment Federation). Total phosphorus and Total K nitrogen were determined in liquid and solid samples using the automated ascorbic acid method (Standard Method 4500-P F) and the phenate method (Standard Method 4500-$NH_3$ G) adapted to digested extracts (Technicon Instruments Corp., 1977, Individual/simultaneous determination of nitrogen and/or phosphorus in BD acid digests (dialyzer), Industrial method 337-74W/B, Tarrytown, N.Y.), respectively. Total nitrogen is the sum of total K nitrogen plus nitrate-nitrogen. Nitrate nitrogen was also determined using Standard Method 4500-$NO_3^-$F; it represented less than about 3% of total nitrogen. The pH of the supernatant liquid was measured electrometrically using a combination pH electrode. Total suspended solids (TSS) were determined by retaining solids on a glass-fiber filter (Whatman grade 934AH, Whatman Inc., Clifton, N.J.) dried to approximately 105° C. (Standard Method 2540 D). Moisture in solids was determined using a microwave moisture analyzer (Omnimark Instrument Corp., Tempe, Ariz.). Elemental analysis of recovered phosphorus-rich solids for total carbon and nitrogen was done by dry combustion (Leco Corp., St. Joseph, Mich.) and for phosphorus, calcium, magnesium, potassium, and sodium by inductively coupled plasma (ICP) from nitric acid plus $H_2O_2$ digested extract (Peters, J., et al., Recommended methods of manure analysis, University of Wisconsin-Extension Publication A3769, 2003).

Figure 3:
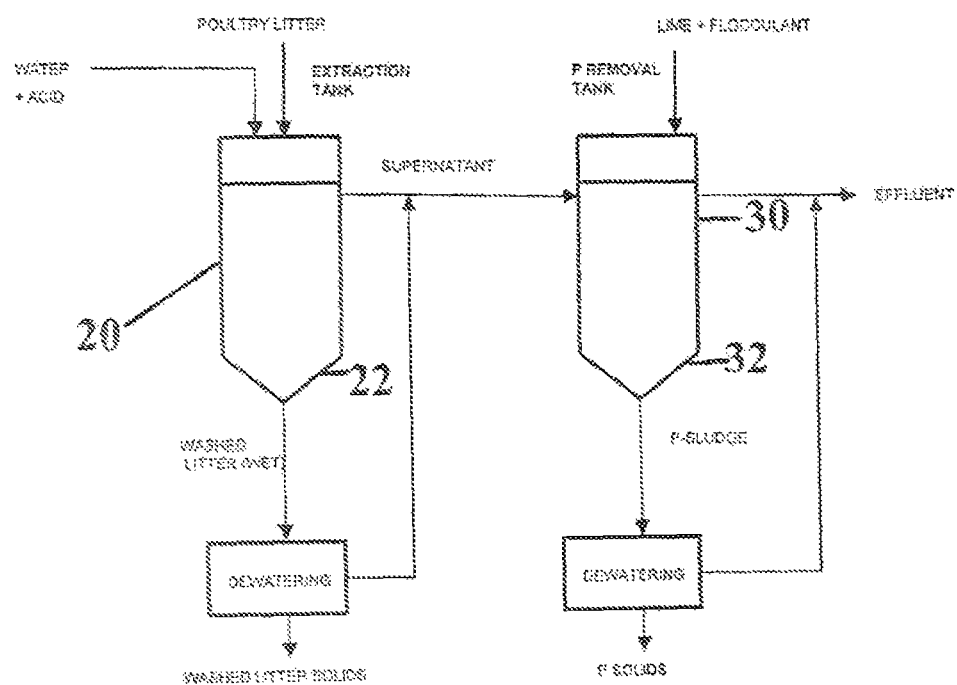
FIG. 3 is a schematic drawing of the field prototype system for solid manure quick wash showing a field prototype system for a solid manure quick wash process including an extraction tank 20, and a phosphorus removal tank 30 as described below.

The process can be carried out in batch mode using a single vessel to do the mixing and settling in step 1 or steps 2 and 3 (FIG. 2) or adapted for continuous operation using two separate vessels, to do the mixing first and then the settling (FIG. 3).

The following examples are intended only to further illustrate the invention and are not intended to limit the scope of the invention as defined by the claims. Unless defined otherwise, all technical and scientific terms used herein have the same meaning as commonly understood by one of ordinary skill in the art to which the invention belongs. The term "about" is defined as plus or minus ten percent; for example, about 100° F. means 90° F. to 110° F. Although any methods and materials similar or equivalent to those described herein can be used in the practice or testing of the present invention, the preferred methods and materials are now described. Poultry litter is used as a model for solid animal or poultry manure to demonstrate the invention.

Example 1

Organic and inorganic acids were tested for their potential to extract phosphorus from poultry litter. Poultry litter samples were prepared by grinding and passing through a sieve of about 5.8 mm. Aqueous solutions of acetic, citric, and hydrochloric acids were added to about 2.00 grams of ground and sieved poultry litter samples in a ratio of about 1:2.5 w/v at concentration levels of about 0, 2.5, 5, 10, 20, 40, and 80 mmoles/liter. The solutions and litter were mixed in a reciprocating shaker at about 135 oscillations/minute at ambient temperature of about 23° C. for approximately 1 hour. Subsequently solids and liquid were separated by centrifuge at about 2000×g for about 5 minutes. The liquid supernatant was decanted and analyzed for pH, total phosphorus (TP), and total Kjeldahl nitrogen (TKN). Solids were air dried at about 40° C. and analyzed for total Kjeldahl and total phosphorus. The experiment was repeated and the treatment control consisted of extraction with distilled water. Treatment efficiency of the various acid treatments was established by comparison of phosphorus extraction relative to initial phosphorus content in untreated poultry litter (Technicon Instruments Corp., 1977), respectively. The ground and sieved poultry litter contained approximately 17.1±0.2% moisture, approximately 35.10±0.02 mg/kg of total kjeldahl nitrogen, and approximately 19.2±0.2 mg/kg total phosphorus (Table 1).

Figure 5:
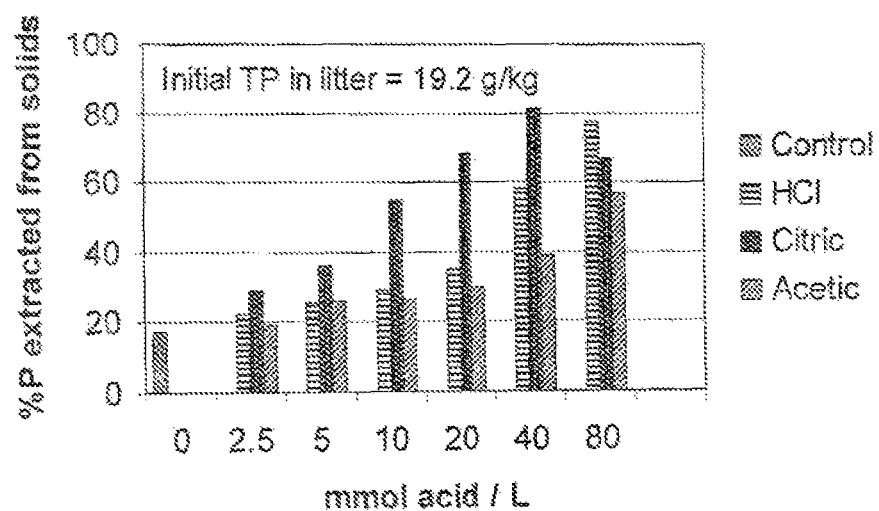
FIG. 5 is a graph showing extraction of phosphorus from poultry liter using acids at seven concentration levels as described below.

Both mineral and organic acids extracted phosphorus from poultry litter (FIG. 5). During extraction, a significant portion of total phosphorus in poultry litter was released from the manure solids. Total phosphorus extraction rates increased with increasing acid concentrations. At approximately 40 mmol/L concentration of acid, about 81% of the initial total phosphorus content in broiler litter was extracted. In contrast, the distilled water (control) extracted only about 20%. In addition to the concentration of acid, the type of acid made a difference. Citric acid was surprisingly more efficient at extracting phosphorus than HCl or acetic acid at similar molar applications (approximately 2.5 to 40 mmol/L). High extraction efficiencies (>70%) were also possible with HCl, but required molar rates that were double (approximately 80 mmol/L).

Even though phosphorus extraction surprisingly increased from approximately 17% to approximately 81% with increased citric acid treatment in the range of approximately 0 to approximately 40 mmol/L, nitrogen extraction was surprisingly not greatly affected (Table 2). Nitrogen contained in litter was extracted much less efficiently than phosphorus. For instance, about 81% of initial total phosphorus in litter was extracted in treatment 5 at about pH 3.8 (approximately 40 mM citric acid) but only about 27% of nitrogen was extracted (Table 2). Thus, the litter wash residue surprisingly resulted in a nitrogen:phosphorus ratio of approximately 9.8. This is surprisingly about 5-fold higher than the nitrogen:phosphorus ratio of the untreated litter (nitrogen:phosphorus ratio of about 2.1). Furthermore, this is in the range of nitrogen:phosphorus ratio required for balanced fertilization of crops for both nitrogen and phosphorus.

Figure 6:
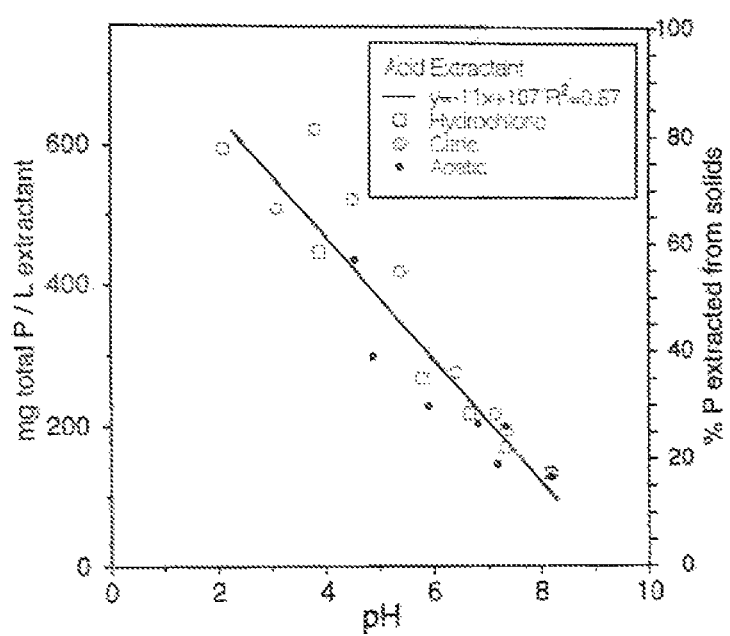
FIG. 6 is a graph showing the pH on total phosphorus extracted from broiler litter as described below. Total phosphorus concentration increased with decreasing pH of mineral and organic acids extracting solutions; more than about 50% of total phosphorus was extracted with respect to initial total phosphorus content in broiler litter at pH lower than 5 of the extracting acid solutions. The % phosphorus extracted from solids corresponds with values in FIG. 5. Variables in regression line y=−11x+107 are x=pH and y=% phosphorus extracted from solids.
Figure 9:
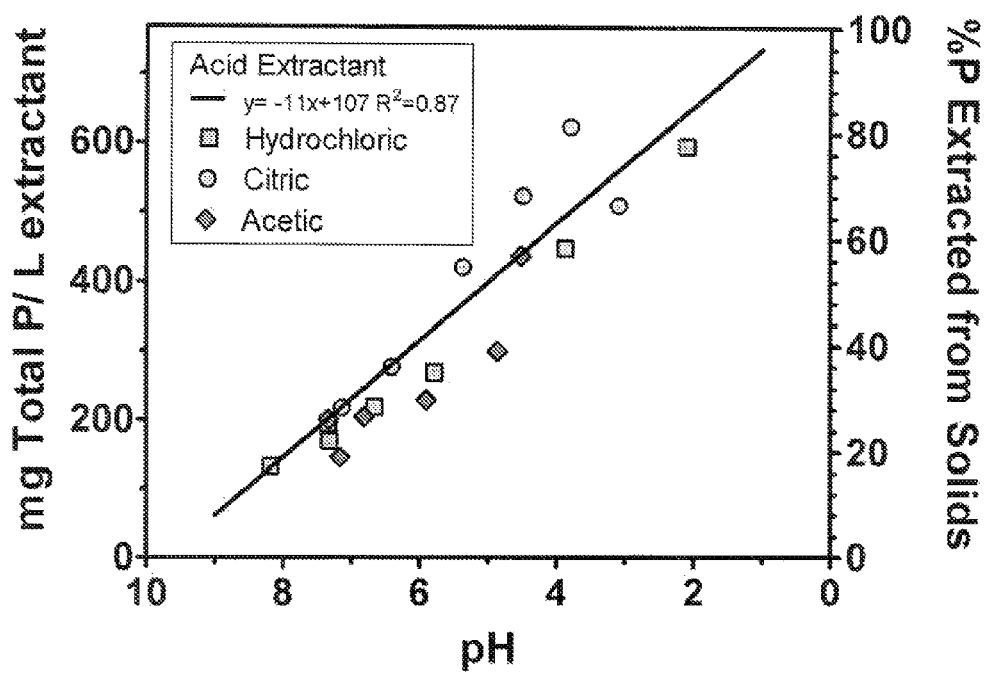
FIG. 9 (another version of FIG. 6) is a graph showing the pH on total phosphorus extracted from broiler litter as described below. Total phosphorus concentration increased with decreasing pH of mineral and organic acids extracting solutions; more than about 50% of total phosphorus was extracted with respect to initial total phosphorus content in broiler litter at pH lower than 5 of the extracting acid solutions. The % phosphorus extracted from solids corresponds with values in FIG. 5. Variables in regression line y=−11x+107 are x=pH and y=% phosphorus extracted from solids.

The percentage of phosphorus extracted from solids increased linearly with decreasing pH ($y=-11x+107$, $R^2=0.87$, $n=19$, $P<0.0001$, FIGS. 6 and 9). Using the equation one can estimate a range of percent phosphorus extracted; for example where pH=3.1, $y=(-11)(3.1)+107=73\%$, or where pH=5.0, $y=(-11)(5.0)+107=52\%$. The pH required to extract % P from solids decreased linearly with increasing phosphorus extraction ($x=(y-107)/-0.11$, $R^2=0.87$, $n=19$, $P<0.0001$, FIGS. 6 and 9). Using the equation one can estimate the pH required to extract a percentage of phosphorus extracted from solids; for example, where % P extracted from solids is 55%, $x=(55\%-107)/-11=4.73$, or where % P extracted from solids is 60%, $x=(60\%-107)/-11=4.27$. Although the quick wash process consistently extracted more than about 50% of total phosphorus when the pH of the acid solution-broiler litter mixture was lower than 5 units, similar percentages of phosphorus from broiler litter were extracted at different acid concentrations (FIG. 5). Thus, the amount of acid added in the process to extract a specific amount of phosphorus can be controlled by setting a specific end point pH using a pH controller. The process includes any pH range along the curve shown in FIG. 6 or 9 (or defined by the above equation); for example pH range of 3.1 to 4.0, or 3.2 to 4.1, or 3.3 to 4.2, etc. The process also includes any % P extracted from solids range along the curve shown in FIG. 6 or 9 (or defined by the above equation); for example 50-60%, or 51-61%, or 52-62%, etc.

Although other mineral and organic acids can be used for the present invention, such as for example, sulfuric, malic, oxalic, phosphoric, nitric ethyldiamintetracetic, etc., the preferred acids are those that do not add phosphorus or nitrogen during the process of extracting phosphorus. Therefore, the use of acids such as phosphoric nitric, or ethyldiamintetracetic is not recommended.

The treated litter (washed solids; washed solid residue) left at the end of the process can now be used for land application at rates based on the nitrogen crop requirements without accumulation of excess phosphorus in the soil. Using data from Edwards and Daniel (1992), a nitrogen:phosphorus ratio of 5.2:1 would be needed to match Kentucky bluegrass specific nutrient uptake needs, which can be delivered with a phosphorus extraction at pH 4.5 (nitrogen:phosphorus=5.5). Higher nitrogen:phosphorus ratios needed for cotton (6.2:1), corn (7.5:1) or wheat (10.7:1) can be obtained at pH<4.5 (Table 2).

TABLE 1

Broiler litter characteristics.

| Experiment | Moisture % | Total Phosphorus g/kg | Total Nitrogen g/kg | Nitrogen: Phosphorus Ratio |
|---|---|---|---|---|
| Examples 1 and 2 Sample 1 | 17.6 | 19.4 | 34.6 | 1.8 |
| Examples 1 and 2 Sample 2 | 16.6 | 19.1 | 35.5 | 1.9 |
| Mean[1] | 17.1(0.2) | 19.2(0.2) | 35.1(0.02) | 1.9 |
| Field Prototype Sample 1 (Run 1) | 29.3 | 12.8 | 25.9 | 2.0 |
| Field Prototype Sample 2 (Run 2) | 27.9 | 18.2 | 26.5 | 1.5 |
| Mean | 28.6(0.6) | 15.2(3.8) | 26.2(0.04) | 1.7 |

[1]Mean value (standard deviation)

TABLE 2

Effect of citric acid treatment on pH of the extraction solution-solids mixture, total P and N extracted, and N:P ratio in solid residue left after washing poultry litter.

| Treatment | pH mixture | Acid mmol/L | Total P extracted[1] g/kg litter | % | Total N extracted[2] g/kg litter | % | % Total P Extracted/ % Total N Extracted | N:P Ratio in Washed Litter |
|---|---|---|---|---|---|---|---|---|
| 0 | 8.2 | 0.0 | 3.3[3] | 17 | 10.2 | 29.1 | 0.58 | 1.2 |
| 1 | 7.1 | 2.5 | 5.5 | 29 | 11.6 | 33.1 | 0.88 | 1.3 |
| 2 | 6.4 | 5 | 6.9 | 36 | 11.1 | 31.7 | 1.13 | 1.4 |
| 3 | 5.4 | 10 | 11 | 55 | 11.4 | 32.5 | 1.69 | 2.5 |
| 4 | 4.5 | 20 | 13 | 68 | 9.6 | 27.4 | 2.48 | 5.5 |
| 5 | 3.8 | 40 | 16 | 81 | 9.4 | 26.8 | 3.02 | 9.8 |
| 6 | 3.1 | 80 | 13 | 67 | 7.7 | 22.0 | 3.05 | 11.1 |

[1]Total P extracted = P extraction relative to initial P content in litter (19.2 g/kg).
[2]Total N extracted = TKN extraction relative to initial TKN content in litter (35.1 g/kg).
[3]Data are the means of two replicates.

Example 2

To demonstrate the removal and recovery of phosphorus from the liquid extract, which includes steps 2 and 3 of the process, generated by litter washing (step 1) (FIG. 2), approximately 64 grams of poultry litter, as prepared in Example 1, was mixed with approximately 1.6 liters of 20 mM citric acid solution in a ratio of 1.25 w/v and stirred for about one hour with a magnetic stirrer. After the mixture settled for about 20 minutes, the liquid extract was separated from washed litter by decantation and transferred to separate laboratory vessels. To one half of the vessels, hydrated lime $(Ca(OH)_2)$ was added, to the other half, lime and flocculant was added. Hydrated lime in water was added in various amounts until the pH of the mixed liquid reached set points of approximately 6, 7, 8, 9, 10, or 11 units (Treatments 1-6, respectively); a control treatment with no lime addition was included (Treatment 0). The recovery of phosphorus was enhanced by adding an organic flocculant to clump the fine particles of the phosphorus precipitate (Step 3). The organic flocculant was an anionic polymer (polyacrylaminde) Magnafloc 120 L with an approximately 34% mole charge and approximately 50% active ingredient (CIBA Specialty Chemicals Water Treatment, Inc., Suffolk, Va.). This flocculant was added at a rate of approximately 7.0 mg/L (active ingredient). For both lime only and lime plus flocculant addition, the liquid supernatant was decanted and analyzed for pH, total phosphorus, and total Khejdahl nitrogen. Solids were air dried at about 40° C. and analyzed for total Khejdahl nitrogen. Treatment efficiency of the various lime and flocculant treatments was expressed as percentage of phosphorus extraction relative to initial phosphorus content. All tests were conducted in duplicate.

A 20 mmol/L citric acid extract solution was selected for step 1 to further recovery of phosphorus with hydrated lime. This liquid extract contained a high total phosphorus concentration of about 600 mg/L at about pH 4.7 (Table 3, Treatment 0) and low total suspended solids (approximately 2.1 g/L) after liquid-solid separation by decantation. In step 2, total phosphorus was removed from solution by precipitating soluble phosphorus compounds under alkaline conditions. Addition of hydrated lime decreased total phosphorus until a pH of approximately 8.0 units was obtained (Table 3).

Subsequent addition of a flocculant improved the percentage of total phosphorus removed at pH higher than 8.0 (Table 4). A small amount of an organic flocculant was added at a rate of about 7 mg/L (active ingredient) to all treatments to enhance thickening and phosphorus grade of the precipitated product (Step 3). Results in Table 4 surprisingly show an increase of the amount of phosphorus extracted and higher phosphorus grade of the precipitate by addition of hydrated lime followed by flocculant enhancement. The highest phosphorus recovery rate and grade in the precipitate (about 18.8% $P_2O_5$) was surprisingly obtained when the pH reached a value of about 10.0 units.

The enhancing effect of organic flocculant addition on total phosphorus content of the precipitate is summarized in Table 5 at three hydrated lime levels (pH approximately 8, 9, and 10) with and without application of polymer after citric acid (approximately 20-mM) extraction. From these results, surprisingly more than 65% of total phosphorus in poultry litter can be recovered by the addition of hydrated lime and small amounts of organic flocculant (Steps 2 and 3).

TABLE 3

Quick wash process (Step 2), hydrated lime application for recovery of extracted soluble phosphorus from broiler litter. Data show total phosphorus concentration in liquid extract and corresponding percentage of total phosphorus removed by increasing pH with hydrated lime after phosphorus extraction (Step 1) with citric acid solution (1:25).

| Treatment[1] | pH | Ca(OH)$_2$ applied g/L liquid | Total phosphorus mg/L | Total phosphorus removed from liquid extract[2] % |
|---|---|---|---|---|
| 0 | 4.7 | 0.0[3] | 613 | 0 |
| 1 | 6.0 | 1.4 | 381 | 39 |
| 2 | 7.0 | 2.0 | 299 | 51 |
| 3 | 8.0 | 2.6 | 215 | 65 |
| 4 | 9.0 | 3.1 | 251 | 59 |
| 5 | 10.0 | 3.7 | 303 | 51 |
| 6 | 11.0 | 4.1 | 236 | 62 |

[1]Treatment of the liquid was done by addition of hydrated lime (2% Ca(OH)$_2$ in water) to obtain a specific pH.
[2]Total P Removed = P recovered from liquid fraction relative to initial P concentration in liquid extract (613 mg/L).
[3]Data are the average of two replicates.

TABLE 4

Quick wash process (Steps 2 and 3), hydrated lime and flocculant application for recovery of extracted soluble phosphorus from broiler litter. Data show total phosphorus recovered per unit weight of broiler litter and phosphorus grade of the recovered phosphorus. Step 1 (P extraction), was carried out using citric acid solution (1:25 w/v).

| Treatment[1] | pH | Ca(OH)$_2$ applied g/L liquid | Ca(OH)$_2$ applied g/kg litter | Total phosphorus recovered[2] g/kg litter | % | Phosphorus grade in precipitate % $P_2O_5$ |
|---|---|---|---|---|---|---|
| 0 | 4.7 | 0.0[3] | 0.0 | 0.5 | 2.8 | 1.4 |
| 1 | 6.0 | 1.4 | 36 | 6.5 | 33.6 | 14.9 |
| 2 | 7.0 | 2.0 | 50 | 8.1 | 42.3 | 11.9 |
| 3 | 8.0 | 2.6 | 65 | 11.7 | 61.0 | 17.6 |
| 4 | 9.0 | 3.1 | 78 | 13.0 | 67.5 | 17.2 |
| 5 | 10.0 | 3.7 | 93 | 13.9 | 72.5 | 18.8 |
| 6 | 11.0 | 4.1 | 104 | 13.5 | 70.4 | 14.4 |

[1]Treatment of the liquid was done by addition of hydrated lime (2% Ca(OH)$_2$ in water) to obtain a specific pH. An anionic polymer (polyacrylamide) was added at a rate of 7 mg/L (active ingredient) to all treatments to enhance precipitation.
[2]Total P recovered = P recovered from liquid fraction relative to initial P content in litter (19.2 g/kg).
[3]Data are the average of two replicates.

TABLE 5

Increased total phosphorus recovery in the quick wash process using anionic polyacrylamide polymer application. Results are compared to total phosphorus recovered without polymer addition. For lime treatment, refer to table 4.

| Lime Treatment | pH[1] | Total P Recovered[2] | | Recovery Increase with Polymer[4] % |
|---|---|---|---|---|
| | | Without polymer | With polymer[3] | |
| | | g/kg litter | | |
| 3 | 8 | 10.0[4] | 11.7 | 14.0 |
| 4 | 9 | 9.1 | 13.0 | 30.0 |
| 5 | 10 | 7.7 | 13.9 | 45.0 |

[1]Specific pH values obtained using hydrated lime (2% $Ca(OH)_2$ in water).
[2]Total P recovered = P removal from liquid fraction relative to initial P content in litter (19.2 g/kg).
[3]Anionic polyacrylamide, 37% charge, applied at a constant rate (7 mg/L active ingredient).
[4]Data are the average of two replicates.

Example 3

A field prototype system was developed to evaluate the process of the present invention to extract and recover phosphorus from poultry litter. The system included two connected reactor vessels (FIG. 3). The extraction vessel 20 in the sequence was the phosphorus extraction reactor that consisted of an approximately 378-liter tank with a conical bottom 22, a mixer 24, and a pH controller (not shown). Once liquid reacted with solids, stirring was stopped to let solids settle. After settling of solids, the supernatant from tank 20 was pumped to a second vessel, a phosphorus removal tank 30. The tank 30 in the sequence was the phosphorus recovery reactor that consisted of a second about 378 liter tank with a conical bottom 32, mixer (not shown) and pH controller (not shown). The unit was completed with a smaller 115 gallon tank (not shown) with a mixer and pump used to stir and inject the hydrated lime solution into the tank 30. Solid and liquid sampling was done in duplicate. Phosphorus extraction was performed by adding citric acid, approximately 10% w/w to a stirred mixture of approximately 15.2 kg of broiler litter, prepared as in Example 1, and water in a ratio of approximately 1:25 w/v inside the extraction reactor 20. Addition of citric acid stopped when the pH of the mixture reached a set point of approximately 4.5. The extraction mixture was sampled about every 10 minutes during about a sixty minute, stirring period to determine the minimum stirring time required to reach a stable total phosphorus concentration in the extraction liquid; total phosphorus was determined in supernatant after about a 24 hour settling of unfiltered samples. The treated litter solids were removed from the bottom of the phosphorus extraction tank 20 after, about a twenty minute-settling period and further dewatered through a filter. The filter was a 0.84 m×0.84 m×0.13 sieve box with a 0.6 wire mesh bottom and a commercial polypropylene non-woven fabric (Dupont E.I. de Nemours, N.J.).

The supernatant from the phosphorus reactor was pumped into the phosphorus recovery reactor tank 30 and hydrated lime; about 10% $Ca(OH)_2$, was injected and mixed pH controller (not shown) stopped the lime injection when the pH of the mixed liquid reached a set point of about 9.0 in the first experiment or about 10 in the second experiment. Once the desired pH was reached, about 15 mg/L of anionic polyacrylamide, a flocculant, was injected and mixed to enhance phosphorus recovery. The precipitated solids were removed from the bottom, of the tank after an approximately 30 minute settling period and dewatered through a filter as described above. The dried P-solids were analyzed for phosphorus, carbon, nitrogen, calcium, magnesium, potassium, and sodium content.

Figure 7:
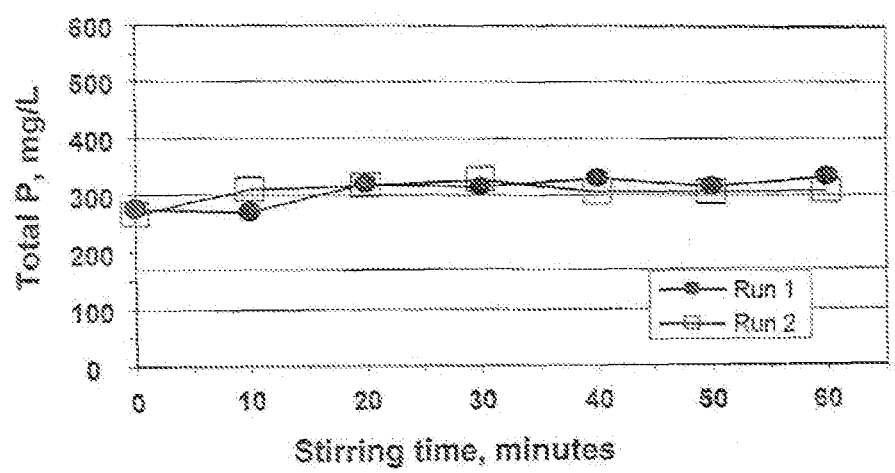
FIG. 7 is a graph showing effect of stirring time on total phosphorus concentration in the extract as described below. Broiler litter was extracted with citric acid solution at pH about 4.5 (step 1). Data show that total phosphorus concentration stays stable in supernatant liquid with stirring time between about 20 and 60 minutes. Data points are average concentrations of two separate runs using the field prototype.

The prototype experiment was based on the acid and alkaline endpoint pH values that were determined in Examples 1 and 2 to extract, and recover more than about 65%, of total phosphorus from poultry litter. This procedure avoided an excessive chemical application. Consequently, in the prototype experiment, phosphorus was extracted from broiler litter using citric acid solution at approximately pH 4.5. The first tested component was the effect of stirring time on amount of phosphorus extracted from the slurry formed by mixing litter and extracting liquid (Step 1). Extracted total phosphorus concentration remained stable (approximately 300-330 mg/L) at pH of approximately 4.5 with stirring time of about 20 minutes or more (FIG. 7). From these results, it was confirmed that stirring time of about 20 to about 60 minutes (e.g., 20 to 60 minutes) is sufficient to obtain a stable total phosphorus extracted concentration during extraction process at a pH of approximately less than 5.0.

Phosphorus extraction performance of the prototype system under field conditions (Table 6) was surprisingly consistent with performance obtained in the laboratory (FIGS. 5 and 6). Phosphorus-extraction efficiencies of approximately 65 to approximately 75% with respect to initial total phosphorus in broiler litter were surprisingly obtained with pH treatment of approximately 4.5 for both runs. As a result of phosphorus extraction, the average nitrogen:phosphorus ratio is better for crop utilization. As an alternative, the dried washed litter could be reused in the broiler house as bedding in geographic areas where bedding materials are in short supply or digested for methane production.

After settling in the phosphorus extraction tank, the supernatant liquid had a low total suspended solids (TSS) concentration of approximately <3.5 g/L, with respect to the total suspended solids concentration of the extraction slurry of approximately 28.7 g/L. This clarified liquid was pumped to the phosphorus recovery tank reactor and treated with hydrated lime and flocculant. This treatment surprisingly recovered approximately 92 to 89% of phosphorus extracted in step 1. The complete process surprisingly recovered >60% of the initial total phosphorus in broiler litter; higher phosphorus recovery rates were obtained at a pH of approximately 10.0 (Table 6).

Before dewatering, mean initial moisture of the phosphorus sludge was about 96.3% (Table 7). After filtration, the sludge had a mean moisture content of about 88.8%. The drying process was further accelerated by placing the phosphorus sludge in a greenhouse. The mean moisture content declined to about <10% in the subsequent thirteen days after filtration.

The prototype performance confirmed laboratory results that about >60% of the total phosphorus content of poultry litter can be surprisingly recovered using the quick wash process of the present invention (Table 6). The phosphorus grade of the product obtained in the prototype was lower (about 11.1% $P_2O_5$=4.85 mg P/100 grams×2.29) than the precipitate obtained in the laboratory (Tables 3 and 8). For example, on a dry matter basis, litter treated in the prototype had a lower mass and lower phosphorus concentration per volume of extracting solution.

In average, the precipitate contained relatively large amounts of phosphorus, carbon (C), nitrogen (N), and calcium (Ca), and small amounts of magnesium (Mg), potassium (K), and sodium (Na) (Table 8). Thus, the resulting molar ratio was about 1:7.0:1.6:1.4 for P:C:N:Ca.

An additional characteristic of the recovered phosphorus product was its surprisingly reduced bulk volume. The recovered phosphorus product (average dry bulk density of about 780 g/dm$^3$) surprisingly had about 17% of the initial volume of poultry litter. Therefore, the recovered phosphorus product can be transported more economically off the farm for use as a fertilizer material.

TABLE 6

Performance of field prototype to remove phosphorus from poultry litter using the quick wash process.

| | Litter Before Wash | | | Extraction | | | Recovery | |
|---|---|---|---|---|---|---|---|---|
| Run | Total P g/kg litter | N:P Ratio[1] | N:P Washed Litter | pH | Total P[2] g/kg litter | % | Total P[3] g/kg litter | % |
| 1 | 12.8 | 2.0 | 4.4 | 4.5 | 8.3 | 65 | 9.0 | 7.7 | 60 |
| 2 | 18.2 | 1.5 | 4.1 | 4.5 | 13.7 | 75 | 10.0 | 12.2 | 67 |
| Average | 15.5 | 1.75 | 4.3 | 4.5 | 11 | 70 | 9.5 | 10.0 | 64 |

[1]Initial N content in litter: 2.59 and 2.65 g/kg for run 1 and 2, respectively.
[2]Total P extracted = P extracted relative to initial P content in litter before wash.
[3]Total P recovered = P recovered in precipitated solids relative to initial P content in litter after flocculant application.

TABLE 7

Percent moisture of phosphorus sludge before and after dewatering.

| Sludge Phosphorus Dewatering | Percent Moisture g per 100 g | | |
|---|---|---|---|
| | Run 1 | Run 2 | Mean |
| Initial Moisture[1] | 96.0 | 96.5 | 96.3 |
| After Filtering[2] | 89.0 | 88.6 | 88.8 |
| Air Dried[3] | 10.1 | 9.1 | 9.6 |

[1]Sludge obtained after decantation of liquid after flocculant addition (step 3)
[2]Dewatering for 24 hours after filtration through polypropylene non-woven filter fabric.
[3]Air dried for 13 days after dewatering in greenhouse, average temperature = 37 degrees C. and relative humidity = 54%

TABLE 8

Percent elemental composition of the solid precipitate produced from poultry litter using the quick wash process.[1]

| | Percent Composition | | |
|---|---|---|---|
| Constituent | Run 1 | Run 2 g per 100 g | Mean |
| Phosphorus | 4.61 | 4.79 | 4.70 (0.13) |
| P$_2$O$_5$[2] | 11.16 | 10.95 | 11.06 (0.15) |
| Carbon | 35.60 | 36.11 | 35.90 (0.36) |
| Nitrogen | 3.61 | 3.47 | 3.54 (0.10) |
| Calcium | 11.89 | 10.54 | 11.22 (0.95) |
| Magnesium | 0.70 | 0.68 | 0.69 (0.01) |
| Potassium | 0.90 | 0.97 | 0.94 (0.05) |
| K$_2$O[3] | 1.08 | 1.16 | 1.12 (0.06) |
| Sodium | 0.29 | 0.33 | 0.31 (0.03) |

[1]Data for run 1 and run 2 obtained at pH 9 and 10, respectively (table 6) expressed as oven dry values. Values in parenthesis are standard deviations.
[2]Phosphorus grade expressed as P$_2$O$_5$ = % P × 2.29.
[3]Potassium grade expressed as K$_2$O = % K × 1.20

Example 4

This Example demonstrated that the manure wash treatment was also surprisingly effective to remove P from other animal manure besides poultry litter. A 64-g hog manure sample was mixed with about 1.6 L of 10-mM citric acid solution and stirred for approximately one hour. Similar to Examples 1 and 2 above, after the manure-liquid extract mixture settled for about 20 minutes, the liquid extract was separated from the washed litter by decantation and transferred to separate laboratory vessels. Hydrated lime was added to the vessels in various amounts until the pH of the mixed liquid reached set points of about 6, 7, 8, 9, 10 and 11 units (Treatments 1-6, respectively); the test included a control (treatment 0) with no lime addition. The recovery of P was enhanced (step 3) by adding the same flocculant as in experiment 2 (7.0 mg L$^{-1}$ active ingredient) to all six lime treatments and control. Liquid supernatant was decanted and analyzed for pH, TP, and TKN; solids were air dried at 40° C. and analyzed for TKN and TP. The tests were conducted in duplicate.

Table 9 shows experimental data supporting that the quick wash process can be surprisingly used for swine manure treatment and other fresh animal manures. In step 1, phosphorus from fresh manure was extracted at pH 4.5 when mixed with 10-mM citric acid (Table 9, treatment 0). Results in Table 9 show a surprising increase of the amount of phosphorus recovered by addition of hydrated lime (step 2) and organic flocculant (step 3). The highest phosphorus recovery rate (6.4 g/kg manure) was surprisingly obtained when the pH reached a value between 9.0 and 10.0 units. Thus, about 90% of total phosphorus in swine manure can be surprisingly recovered by the addition of hydrated lime and small amount of organic flocculant. From this example, we concluded that the quick wash treatment can be used for P extraction and recovery from animal manures other than poultry litter.

TABLE 9

Quick wash process (steps 2 and 3), hydrated lime and flocculant application for recovery of phosphorus from swine manure after phosphorus extraction (step 1) with citric acid solution. Data show phosphorus recovered fresh swine manure by increasing pH with hydrated lime and organic flocculant addition.

| | | Total P Recovered | |
|---|---|---|---|
| Lime Treatment | pH[1] | g/kg manure | % |
| 0 | 4.5 | 0.0 | 0 |
| 1 | 6.0 | 2.2 | 31 |
| 2 | 7.0 | 4.7 | 66 |
| 3 | 8.0 | 6.2 | 87 |
| 4 | 9.0 | 6.4 | 90 |
| 5 | 10.0 | 6.4 | 90 |
| 6 | 11.0 | 6.3 | 89 |

[1]Specific pH treatment was obtained by addition of hydrated lime (2% Ca(OH)$_2$ in water). An anionic polymer (polyacrylamide) was added at a rate of 7 mg/L (active ingredient) to all treatments to enhance precipitation.
[2]% Total P recovered = P recovered relative to initial P content in fresh swine manure (7.1 g/kg). Solids content of fresh manure = 30%.
[3]Data are the average of two replicates.

TABLE 10

(A) Percent composition of raw poultry litter; (B) percent composition of washed solid residue; and (C) percent of each constituent remaining in the washed solid residue with respect to initial content in raw poultry litter [C = (B/A) * 100].

| | Percent Composition[1] | | | | | | | | |
|---|---|---|---|---|---|---|---|---|---|
| | (A) Raw Poultry Litter | | | (B) Washed Solid Residue[2] | | | (C) Remaining in Washed Solid Residue | | |
| Constituent | Run 1 | Run 2 | Mean[3] | Run 1 | Run 2 | Mean | Run 1 | Run 2 | Mean |
| | | | g per 100 g | | | | | % | |
| Phosphorus | 1.28 | 1.82 | 1.55 (0.38) | 0.50 | 0.42 | 0.46 (0.06) | 39.1 | 23.1 | 31.1 (11.3) |
| $P_2O_5$[4] | 2.93 | 4.17 | 3.55 (0.88) | 1.15 | 0.96 | 1.06 (0.13) | 39.1 | 23.1 | 31.1 (11.3) |
| Carbon | 39.30 | 35.36 | 37.33 (2.79) | 41.00 | 35.49 | 38.25 (3.90) | 104.3 | 100.4 | 102.3 (2.8) |
| Nitrogen | 2.59 | 2.65 | 2.62 (0.04) | 2.10 | 1.82 | 1.96 (0.20) | 81.1 | 68.7 | 74.9 (8.8) |
| Calcium | 1.93 | 1.87 | 1.90 (0.04) | 1.50 | 0.32 | 0.91 0.83) | 77.7 | 17.1 | 47.4 (42.9) |
| Magnesium | 0.49 | 0.71 | 0.60 (0.16) | 0.13 | 0.13 | 0.13 (0.00) | 26.5 | 18.3 | 22.4 (5.8) |
| Potassium | 2.71 | 3.61 | 3.16 (0.64) | 0.39 | 0.48 | 0.44 (0.06) | 14.4 | 13.3 | 13.8 (0.8) |
| $K_2O$[5] | 3.25 | 4.33 | 3.79 (0.76) | 0.47 | 0.57 | 0.52 (0.07) | 14.5 | 13.2 | 13.8 (0.9) |
| Sodium | 0.87 | 1.14 | 1.01 (0.19) | 0.17 | 0.20 | 0.19 (0.02) | 19.5 | 17.5 | 18.5 (1.4) |
| Sulfur | 0.65 | 0.8 | 0.73 (0.11) | 0.27 | 0.25 | 0.26 (0.01) | 41.5 | 31.3 | 36.4 (7.3) |

[1]Data expressed as oven dry values.
[2]Solid residue obtained after washing raw poultry litter using the quick wash process at pH = 4.5.
[3]Values in parenthesis are standard deviations.
[4]Phosphorus grade expressed as $P_2O_5$ = % Phosphorus × 2.29.
[5]Potassium grade expressed as $K_2O$ = % Potassium × 1.20.

TABLE 11

(A) Percent composition of raw poultry litter; (B) percent composition of washed solid residue; and (C) percent of phosphorus and nitrogen gv

| | | | Percent Composition[1] | | | | | | | | |
|---|---|---|---|---|---|---|---|---|---|---|---|
| | | | (A) Raw Poultry Litter | | | (B) Washed Solid Residue[2] | | | (C) Remaining in Washed Solid Residue | | |
| Acid mmoL/L | pH Mixture | Constituent | Run 1 | Run 2 | Mean[3] | Run 1 | Run 2 | Mean | Run 1 | Run 2 | Mean |
| | | | | | g/100 g | | | | | % | |
| 0 | 8.2 (0.1) | Phosphorus | 1.93 | 1.91 | 1.92 (0.01) | 1.99 | 1.61 | 1.80 (0.27) | 103.1 | 84.3 | 93.7 (13.3) |
| | | Nitrogen | 3.46 | 3.55 | 3.51 (0.06) | 2.55 | 1.95 | 2.25 (0.42) | 73.7 | 54.9 | 64.3 (13.3) |
| 2.5 | 7.1 (0:1) | Phosphorus | 1.93 | 1.91 | 1.92 (0.01) | 1.61 | 1.60 | 1.61 (0.01) | 83.4 | 83.8 | 83.6 (0.2) |
| | | Nitrogen | 3.46 | 3.55 | 3.51 (0.06) | 2.11 | 2.16 | 2.14 (0.04) | 61.0 | 60.8 | 60.9 (0.1) |
| 5 | 6.4 (0.1) | Phosphorus | 1.93 | 1.91 | 1.92 (0.01) | 1.58 | 1.54 | 1.56 (0.03) | 81.9 | 80.6 | 81.2 (0.9) |
| | | Nitrogen | 3.46 | 3.55 | 3.51 (0.06) | 2.17 | 2.31 | 2.24 (0.10) | 62.7 | 65.1 | 63.9 (1.7) |
| 10 | 5.4 (0.1) | Phosphorus | 1.93 | 1.91 | 1.92 (0.01) | 1.08 | 0.84 | 0.96 (0.17) | 56.0 | 44.0 | 50.0 (8.5) |
| | | Nitrogen | 3.46 | 3.55 | 3.51 (0.06) | 2.32 | 2.55 | 2.44 (0.16) | 67.1 | 71.8 | 69.4 (3.4) |
| 20 | 4.5 (0.1) | Phosphorus | 1.93 | 1.91 | 1.92 (0.01) | 0:50 | 0.51 | 0.51 (0.01) | 25.9 | 26.7 | 26.3 (0.6) |
| | | Nitrogen | 3.46 | 3.55 | 3.51 (0.06) | 2.71 | 2:93 | 2.82 (0.16) | 78.3 | 82.5 | 80.4 (3.0) |
| 40 | 3.8 (0.0) | Phosphorus | 1.93 | 1.91 | 1.92 (0.01) | 0.34 | 0.27 | 0.31 (0.05) | 17.6 | 14.1 | 15.9 (2.5) |
| | | Nitrogen | 3.46 | 3.55 | 3.51 (0.06) | 2.97 | 3.13 | 3.05 (0.11) | 85.8 | 88.2 | 87.0 (1.6) |
| 80 | 3.1 (0.1) | Phosphorus | 1.93 | 1.91 | 1.92 (0.01) | 0.32 | 0.30 | 0.31 (0:01) | 16.6 | 15.7 | 16.1 (0.6) |
| | | Nitrogen | 3.46 | 3.55 | 3.51 (0.06) | 3.11 | 3.75 | 3.43 (0.45) | 89.9 | 105.6 | 97.8 (11.1) |

[1]Data expressed as oven dry values.
[2]Solid residue obtained after washing raw poultry litter using the quick wash process at increasing concentrations of acid.
[3]Values in parenthesis are standard deviations.

Van Slyke (U.S. Pat. No. 6,916,426) discloses to extract ammonium, phosphorus and potassium from an animal waste slurry to form ureates of potassium and ammonium in crystalline form. Van Slyke further discloses that a substantial amount of potassium is extracted as ureates of potassium using flocculation before they degrade. Therefore, the solid material disclosed by Van Slyke contains substantial amounts of the potassium, nitrogen and phosphorus that was contained in the original animal waste sludge. Our fertilizer phosphorus product material is low in potassium (e.g., potassium content of less than 1% in Table 8) and low in nitrogen (e.g., nitrogen content of less than 4 in Table 8) because the acid treatment that we apply with our process would solubilize and destroy the potassium ureates, and the potassium remains in solution in the liquid extract. Our subsequent alkaline addition to the liquid extract reaching a pH between 8 and 11 does not recover significant amounts of the solubilized potassium that resulted from the destruction of the potassium ureates at acid pH. Therefore, our phosphorus fertilizer product contains low concentrations of potassium (e.g., Table 8, where total potassium is at most 0.97%). In contrast, our process does not involve ureates; there is also no flocculation of our initial animal wastes prior to or during our acid addition and/or lime addition.

Our process does not involve anaerobic digestion, composting, or direct combustion processes as disclosed in Kelleher et al., Bioresource Technology, 83: 27-36 (2002).

The solid poultry or animal wastes utilized by the process of the present invention are not incinerated before or during our process; in other words the present invention does not concern incinerated materials (e.g., incineration ash in JP 2000189927) which are devoid of oxidizable organic carbon and nitrogen and therefore are not solid organic wastes. The present process does not involve the addition of ammonium sulfate nor the production of aluminum phosphates.

The pre-treatment of solids using wet oxidation or fenton oxidation according to Kida (JP 20033200199) destroys the organic matter and solubilizes phosphorus. Nitrogen and organic substances in the sludge are removed by nitrification-denitrification. A wet oxidative pre-treatment to solid poultry or animal waste is contrary to our teaching of removing, phosphorus while conserving most of the carbon and nitrogen in the washed litter residue. In addition, our process does not use nitrification-denitrification to destroy carbon and nitrogen compounds form the solid poultry and animal waste. Furthermore, Kida is different from our process because Kida applies hydrochloric acid to a pH of less than 2 to remove phosphorus only from the ash of the deposit of undigested sludge already separated from supernatant liquid; in contrast, in our process the acid (e.g., at a pH lower than 5.0 and higher than 3.0) is first applied to the entire mass of poultry litter or animal waste to remove phosphorus prior to separation of the formed liquid extract and soluble phosphorus from the washed solid residue.

The process of Higashida (U.S. Pat. No. 5,378,257) is different from our process since it does not form (1) a liquid extract and soluble phosphorus and (2) a washed solid residue, and mixing said liquid extract with an alkaline earth base (e.g., calcium hydroxide). Higashida's process is unrelated to our process of removing phosphorus from solid organic wastes because Higashida does not separate solids from liquid. In Higashida, the Waste material is simply processed by adding nitric acid, crushing the material, adding quicklime, and drying it. In addition, Higashida's process destroys organic matter, which is contrary to the conservation of organic carbon and nitrogen in our process. Higashida teaches that waste matter (e.g., sewage) is oxidized with nitric acid incorporated in it (column 3, lines 30-31; column 4, lines 23-25). Therefore, Higashida's discloses a process that oxidizes, corrodes and destroys the organic matter of organic waste materials. In contrast, our process does not oxidize waste material since our process does not utilize a pH lower than 3.0 where unnecessary carbon and nitrogen digestion would occur which would destroy oxidizable organic carbon and nitrogen.

The method disclosed by Angell (U.S. Pat. No. 5,422,015) adds to solid waste a combination of acid plus a base that produces a strong exothermic reaction that elevates the temperature to at least 70° C. Angell's method has the purpose of disinfecting the waste but not the separation of phosphorus from the waste; phosphorus may even be added for binding heavy metals (see Claim 18) to produce a material rich in nitrogen, phosphorus, and potassium (Claim 19). Angell's method is different and unrelated to our process since Angell's method uses the combination of a strong acid and a strong base to create an exothermic reaction when in contact with the waste. In contrast, our process uses acid at such low concentrations that its reaction with the waste does not produce heat. Also, Angell's method requires temperatures of at least 70° C., while our process removes phosphorus from poultry litter and animal waste at ambient temperature of less than about 50° C. Furthermore, Angell's process is an exothermic process developed to kill pathogens but it does not separate phosphorus. Unlike Angell, our process does not involve adding acid and base at the same time and to the same material.

Cabello-Fuentes (U.S. Patent Application Publication No. 2004/0025553) discloses a process for treating sludge involving a first step of disinfecting the sludge by heating the sludge at a temperature of between about 50° C. to 100° C., preferably at 80° C., by means of a heat exchanger, and adding mineral acids in order to decrease the pH of the mass to 3.0 or less, thus guaranteeing that all pathogen microorganisms are destroyed. In contrast, our process does not involve heating solid wastes to a temperature of between about 50° C. to 100° C. and adding acids to decrease the pH of the mass to 3.0 or less.

Our process has, in part, the following advantages: It extracts and recovers phosphorus from organic solid wastes (poultry and animal manures) without the need for destroying the organic carbon as it is usually done during incineration or acid digestion of organic wastes. In addition to conserving the carbonaceous matter, our process conserves most of the nitrogen through a selective hydrolysis reaction. Thus it produces a material with elemental nitrogen to phosphorus ratio (N:P) of more than 4 that is optimal for use in crop production and helps to prevent the eutrophication of surface waters. This washed material contains most of the original carbon, most of the original nitrogen and a reduced amount of the original phosphorus which is more desirable for poultry and livestock producers—such as poultry farmers in the Chesapeake Bay area, Arkansas, and other areas with intensive poultry production—that have problems disposing poultry litter without contaminating soils and water resources with phosphorus. Therefore, poultry producers can use our process to wash the poultry waste to remove only the deleterious constituent for environmental compliance—the phosphorus—and maintaining in the washed residue the desirable constituents that benefit their crops within their operation consisting of the nitrogen with important savings in nitrogen fertilizer cost and the organic carbon which helps to build the organic matter in the soil and improves soil health, water retention, and resistance to drought. Another advantage of our process is that the extracted phosphorus is transferred into a concentrated calcium phosphate fertilizer product that can be easily transported away from areas with excess phosphorus due to intensive poultry and livestock production and be used effectively to substitute for mined phosphate fertilizer used in crop and horticulture production. Another advantage of our process is that heating is not needed and it can be optimally performed at ambient temperatures between 5° and 50° C.

All of the references cited herein, including U.S. Patents, are incorporated by reference in their entirety. Also incorporated by reference in their entirety are the following references: Bolan, N., et al., The management of phosphorus in poultry litter, Proc. New Zealand Poultry Industry Annual Conf., Oct. 7-9, 2008, Palmerson North, NZ, p. 1.56-168; Cantrell, K. B., et al., Plant nutrients and bioenergy via a new quick wash procedure for livestock manures, pp. 1238-1244, Proc. Beltwide Cotton Conf., San Antonio, Tex., Jan. 5-8, 2009; Donatello et al., "Production of Technical Grade Phosphoric Acid from Incinerator Sewage Sludge Ash", Waste Management, 30: 1634-1642 (2010); Jackson et al., "Trace Element Speciation in Poultry Litter", Journal of Environmental Quality, 32: 535-540 (2003); Moore, P. A., 2002, Best management practices for poultry manure utilization that enhance agricultural productivity and reduce pollution, p. 89-123, In J. L. Hatfield and B. A. Stewart (eds.), Animal waste utilization: Effective use of manure as a soil resource, Lewis Publishers/CRC Press, Boca Raton, Fla.; Szogi, A. A., et al., Fertilizer effectiveness of phosphorus recovered from broiler litter, Agron. J., 102(2): 723-727 (2010); Szogi, A. A., et al., Agronomic effectiveness of phosphorus materials recovered from manure, 13th RAMIRAN Int'l. Conf., Jun. 11-14, 2008, Albana, Bulgaria, pp. 52-56; Szogi, A. A., et al., Phosphorus recovery from poultry litter, Trans. ASABE, 51(5): 1727-1734 (2008); Szogi, A. A., and M. B. Vanotti, Prospects for phosphorus recovery from poultry litter, Bioresource Tech. 100:5461-5465 (2009); Szogi, A. A., et al., Effectiveness of recovered manure phosphorus as plant fertilizer, pp. 133-136, Proc. 1st Int'l. Symp. on Management of Animal Residuals, Mar. 11-13, 2009, Florianopolis, Brazil (SIGERA); Szogi, A., and M. Vanotti, Closing the loop for nutrients in livestock wastes: Phosphorus recovery from animal manure, 2008 ASA Annual Mtgs., Oct. 5-9, 2008, Houston, Tex.; Szogi, A. A., et al., Distribution of phosphorus in an Ultisol fertilized with recovered manure phosphates, p. 95-98, In: Proceedings 19th World Soil Congress, Aug. 1-6, 2010, Brisbane, Australia, Published in DVD; Bolan N., et al., The management of phosphorus in poultry litter, In: Proceedings 19th World Soil Congress, p. 317-320, Aug. 1-6, 2010, Brisbane, Australia, Published in DVD.

Thus, in view of the above, the present invention concerns (in part) the following:

A process for removing phosphorus from solid poultry or animal wastes comprising (or consisting essentially of or consisting of):

(a) mixing said solid poultry or animal wastes with water and acid at a pH lower that about 5.0 and higher than about 3.0 to form (i) a liquid extract that contains suspended solids of about 3.5 g/L and soluble phosphorus and (ii) a washed solid residue, wherein said washed solid residue has a N:P ratio of at least more than 4 expressed on an elemental basis and contains no more than about 40% of the total phosphorus in said solid poultry or animal wastes, (b) separating said liquid extract from said washed solid residue to form separated liquid extract and separated washed solid residue, (c) mixing said separated liquid extract with an alkaline earth base to a pH of about 8.0 to about 11.0, (d) mixing said liquid extract with a flocculant to form (i) precipitated phosphorus solids with $P_2O_5$ content greater than about 10% and (ii) a liquid, and (e) separating said precipitated phosphorus solids from said liquid to form separated phosphorus solids and separated liquid;

wherein said process is conducted at a temperature greater than about 5° C. and less than about 50° C., wherein said solid poultry or animal wastes are not pretreated prior to step (a), and wherein steps (c) and (d) are either sequential or simultaneous.

The above process, wherein said process comprises mixing said solid poultry or animal wastes with water and acid at a pH lower that about 5.0 and higher than about 3.0. The above process, wherein said process comprises mixing said solid poultry or animal wastes with water and acid at a pH lower that about 5.0 and higher or equal to 3.1.

The above process, wherein said process is conducted at ambient temperature.

The above process, wherein said process is conducted at a temperature greater than about 5° C. and less than about 45° C. The above process, wherein said process is conducted at a temperature greater than about 5° C. and less than 45° C. The above process, wherein said process is conducted at a temperature greater than about 5° C. and less than about 40° C.

The above process, wherein said solid poultry or animal wastes are not incinerated before or during said process.

The above process, wherein said-acid is selected from the group consisting of a mineral acid, an organic acid, and mixtures thereof and their precursors.

The above process, wherein said acid is selected from the group consisting of citric acid, oxalic acid, malic acid, hydrochloric acid, sulfuric acid, and mixtures thereof. The above process, wherein said acid is citric acid.

The above process, wherein said alkaline earth base is selected from the group consisting of calcium hydroxide, magnesium hydroxide, calcium oxide, magnesium oxide, and mixtures thereof.

The above process, wherein said steps (c) and (d) are sequential.

The above process, wherein said steps (c) and (d) are simultaneous.

The above process, wherein said washed solid residue contains the oxidizible organic carbon and nitrogen fraction that would be digested and oxidized if said solid poultry or animal wastes had instead been washed by mixing said-solid poultry or animal wastes with water and acid at a pH below about 3.0 or that would be lost if said solid poultry or animal wastes had instead been incinerated before being mixed with water and acid.

The above process, wherein said solid poultry or animal wastes are not pretreated (e.g., incinerated, or treated with flocculant) prior to said mixing said solid poultry or animal wastes with water and acid.

A material produced by a process comprising (or consisting essentially of or consisting of):

(a) mixing solid poultry or animal wastes with water and acid at a pH lower that about 5.0 and higher than about 3.0 to form (i) a liquid extract that contains suspended solids of about 3.5 g/L and soluble phosphorus and (ii) a washed solid residue, wherein said washed solid residue contains a N:P ratio of at least more than 4 expressed on an elemental basis and contains no more than about 40% of the total phosphorus in said solid poultry or animal wastes, (b) separating said liquid extract from said washed solid residue to form separated liquid extract and separated washed solid residue, (c) mixing said separated liquid extract with an alkaline earth base to a pH of about 8.0 to about 11.0, (d) mixing said liquid extract with a flocculant to form (i) precipitated phosphorus solids with $P_2O_5$ content greater than about 10% and (ii) a liquid, and (e) separating said precipitated phosphorus solids from said liquid to form separated phosphorus solids and separated liquid, wherein said process is conducted at a temperature greater than about 5° C. and less than about 50° C., and wherein said solid poultry or animal wastes are not pretreated prior to step (a), and wherein steps (c) and (d) are either sequential or simultaneous;

wherein said material is said separated phosphorus solids and contains greater than about 10% $P_2O_5$, greater than about 10% Ca, less than about 5% N, and less than about 5% K as $K_2O$.

The above material, wherein said material contains greater than 10% $P_2O_5$.

The above material, wherein said material contains greater than 10% Ca.

The above material, wherein said material contains less than 4.5% N. The material, wherein said material contains less than 4% N.

The above material, wherein said material contains less than 4.5% K as $K_2O$. The material, wherein said material contains less than 4% K as $K_2O$. The material, wherein said material contains less than 3.5% K as $K_2O$. The material, wherein said material contains less than 3% K as $K_2O$. The material, wherein said material contains less than 2.5% K as $K_2O$. The material, wherein said material contains less than 2% K as $K_2O$.

The above material, wherein said washed solid residue contains the oxidizible organic carbon and nitrogen fraction that would be digested and oxidized if said solid poultry or animal wastes had instead been washed by mixing said solid poultry or animal wastes with water and acid at a pH below about 3.0 or that would be lost if said solid poultry or animal wastes had instead been incinerated before being mixed with water and acid.

A material produced by a process comprising (or consisting essentially of or consisting of):

(a) mixing solid poultry or animal wastes with water and acid at a pH lower that about 5.0 and higher than about 3.0 to form (i) a liquid extract that contains suspended solids of about 3.5 g/L and soluble phosphorus and (ii) a washed solid residue, and (b) separating said liquid extract from said washed solid residue to form separated liquid extract and separated washed solid residue;

wherein said material is said separated washed solid-residue and contains a N:P ratio of at least more than 4 expressed on an elemental basis and contains no more than about 40% of the total phosphorus in said solid poultry or animal wastes.

The above material, wherein said material contains less than about 5% (e.g., less than 5%) $P_2O_5$. The material, wherein said material contains less than 5% $P_2O_5$. The material, wherein said material contains less than 4% $P_2O_5$. The material, wherein said material contains less than 3% $P_2O_5$. The material, wherein said material contains less than 2% $P_2O_5$.

The above material, wherein said washed solid residue contains the oxidizible organic carbon and nitrogen fraction that would be digested and oxidized if said solid poultry or animal wastes had instead been washed by mixing said solid poultry or animal wastes with water and acid at a pH below about 3.0 or that would be lost if said solid poultry or animal wastes had been instead incinerated before being mixed with water and acid.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A process for selectively removing phosphorus from solid poultry or animal wastes containing phosphorus, nitrogen and carbon, said process comprising:

(a) mixing said solid poultry or animal wastes with water and acid at a pH lower than about 5.0 and higher than 3.0 to form (i) a liquid extract that contains suspended solids of about 3.5 g/L and soluble phosphorus and (ii) a washed solid residue, wherein said washed solid residue has a N:P ratio of at least more than 4 expressed on an elemental basis and contains no more than about 40% of the total phosphorus in said solid poultry or animal wastes, (b) separating said liquid extract from said washed solid residue to form separated liquid extract and separated washed solid residue, (c) mixing said separated liquid extract with an alkaline earth base to a pH of about 8.0 to about 11.0, (d) mixing said liquid extract with a flocculant to form (i) precipitated phosphorus solids with $P_2O_5$ content greater than about 10% and (ii) a liquid, and (e) separating said precipitated phosphorus solids from said liquid to form separated phosphorus solids and separated liquid;

wherein said process is conducted at a temperature greater than about 5° C. and less than about 50° C., wherein said solid poultry or animal wastes are not pretreated prior to step (a), wherein said solid poultry or animal wastes are not incinerated before or during said process, and wherein steps (c) and (d) are either sequential or simultaneous.

2. The process of claim 1, wherein said process comprises mixing said solid poultry or animal wastes with water and acid at a pH of 3.8 to 4.5.

3. The process of claim 1, wherein said process comprises mixing said solid poultry or animal wastes with water and acid at a pH lower than about 5.0 and higher or equal to 3.1.

4. The process of claim 1, wherein said process is conducted at ambient temperature.

5. The process of claim 1, wherein said process is conducted at a temperature greater than about 5° C. and less than about 45° C.

6. The process of claim 1, wherein said process is conducted at a temperature greater than about 5° C. and less than 45° C.

7. The process of claim 1, wherein said process is conducted at a temperature greater than about 5° C. and less than about 40° C.

8. The process of claim 1 wherein said acid is selected from the group consisting of a mineral acid, an organic acid, and mixtures thereof and their precursors.

9. The process of claim 1, wherein said acid is selected from the group consisting of citric acid, oxalic acid, malic acid, hydrochloric acid, sulfuric acid, and mixtures thereof.

10. The process of claim 1, wherein said acid is citric acid.

11. The process of claim 1, wherein said alkaline earth base is selected from the group consisting of calcium hydroxide, magnesium hydroxide, calcium oxide, magnesium oxide, and mixtures thereof.

12. The process of claim 1, wherein said steps (c) and (d) are sequential.

13. The process of claim 1, wherein said steps (c) and (d) are simultaneous.

14. The process of claim 1, wherein said washed solid residue contains the oxidizible organic carbon and nitrogen fraction that would be digested and oxidized if said solid poultry or animal wastes had been washed by mixing said solid poultry or animal wastes with water and acid at a pH below about 3.0 or that would be lost if said solid poultry or animal wastes had been incinerated before being mixed with water and acid.

15. The process of claim 1, wherein said process comprises mixing said separated liquid extract with an alkaline earth base to a pH of 9.0 to 11.0.

16. The process of claim 1 wherein said acid does not add phosphorus or nitrogen during said process.

17. The process of claim 1, wherein said process is conducted at a temperature of greater than about 10° C. and less than about 45° C.

18. The process of claim 1, wherein said process is conducted at a temperature of greater than 10° C. and less than 45° C.

19. The process of claim 1, wherein the percent phosphorus removed from said solid poultry or animal wastes is determined by the following formula: $y=-11x+107$ where x is pH and y is percent phosphorus extracted from said solid poultry or animal wastes.

20. A process for removing phosphorus from solid poultry or animal wastes comprising:
(a) mixing said solid poultry or animal wastes with water and acid at a pH between 3.1 and lower than about 5.0 to form (i) a liquid extract that contains suspended solids of about 3.5 g/L and soluble phosphorus and (ii) a washed solid residue, wherein said washed solid residue has a N:P ratio of 4.1 or more expressed on an elemental basis and contains no more than 40% of the total phosphorus in said solid poultry or animal wastes,
(b) separating said liquid extract from said washed solid residue to form separated liquid extract and separated washed solid residue,
(c) mixing said separated liquid extract with an alkaline earth base to a pH of about 8.0 to about 11.0,
(d) mixing said liquid extract with a flocculant to form (i) precipitated phosphorus solids with $P_2O_5$ content greater than about 10% and (ii) a liquid, and
(e) separating said precipitated phosphorus solids from said liquid to form separated phosphorus solids and separated liquid.

21. The process according to claim 20, wherein said acid does not add phosphorus or nitrogen during said process.

* * * * *